US012114144B2

(12) United States Patent
Vuine

(10) Patent No.: US 12,114,144 B2
(45) Date of Patent: Oct. 8, 2024

(54) LOUDSPEAKER

(71) Applicant: PSS BELGIUM NV, Dendermonde (BE)

(72) Inventor: Fabian Vuine, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 116 days.

(21) Appl. No.: 17/906,662

(22) PCT Filed: Mar. 15, 2021

(86) PCT No.: PCT/EP2021/056561
§ 371 (c)(1),
(2) Date: Sep. 19, 2022

(87) PCT Pub. No.: WO2021/185777
PCT Pub. Date: Sep. 23, 2021

(65) Prior Publication Data

US 2023/0117408 A1 Apr. 20, 2023

(30) Foreign Application Priority Data

Mar. 20, 2020 (GB) ..................................... 2004076

(51) Int. Cl.

| | |
|---|---|
| ***H04R 7/16*** | (2006.01) |
| ***H04R 1/02*** | (2006.01) |
| ***H04R 13/00*** | (2006.01) |

(52) U.S. Cl.
CPC ............... *H04R 7/16* (2013.01); *H04R 1/025* (2013.01); *H04R 13/00* (2013.01); *H04R 2400/11* (2013.01)

(58) Field of Classification Search
CPC .......... H04R 7/16; H04R 1/025; H04R 13/00; H04R 2400/11
See application file for complete search history.

(56) References Cited

U.S. PATENT DOCUMENTS 1,792,300 A 2/1931 Hanna
2,238,741 A 4/1941 Lauffer
(Continued)

FOREIGN PATENT DOCUMENTS

CN 1910951 A 2/2007
CN 208968904 U 6/2019
(Continued)

OTHER PUBLICATIONS

ISA/EP, International Search Report and Written Opinion for corresponding PCT Patent Application No. PCT/EP2021/056561, mailed May 21, 2021, 13 pages.
(Continued)

*Primary Examiner* — Andrew Sniezek
(74) *Attorney, Agent, or Firm* — NK Patent Law

(57) ABSTRACT

A loudspeaker configured to be mounted in a seat assembly is disclosed. The loudspeaker includes: a diaphragm having a first radiating surface and a second radiating surface, wherein the first radiating surface and the second radiating surface are located on opposite faces of the diaphragm; a drive unit configured to move the diaphragm based on an electrical signal; a loudspeaker support structure, wherein the diaphragm is suspended from the loudspeaker support structure via one or more loudspeaker suspension elements.

19 Claims, 14 Drawing Sheets

(56) References Cited

U.S. PATENT DOCUMENTS

| | | | | |
|---|---|---|---|---|
| 6,681,024 | B2 * | 1/2004 | Klein | H04R 5/02 381/301 |
| 2002/0067842 | A1 | 6/2002 | Takahashi et al. | |
| 2004/0131217 | A1 | 7/2004 | Opie et al. | |
| 2007/0280499 | A1 | 12/2007 | Foletta | |
| 2009/0003645 | A1 * | 1/2009 | Andersen | H04R 9/04 381/405 |
| 2014/0064542 | A1 * | 3/2014 | Bright | H04R 1/086 381/359 |
| 2015/0289058 | A1 * | 10/2015 | Christoph | H04S 7/301 381/103 |
| 2017/0353785 | A1 | 12/2017 | Choi et al. | |
| 2018/0115830 | A1 * | 4/2018 | Salvatti | H04R 9/04 |
| 2018/0310092 | A1 | 10/2018 | Mei et al. | |
| 2020/0043991 | A1 | 2/2020 | Noh et al. | |

FOREIGN PATENT DOCUMENTS

| | | | |
|---|---|---|---|
| EP | 1458215 | A2 | 9/2004 |
| EP | 1686832 | A1 | 8/2006 |
| GB | 790998 | A | 2/1958 |
| GB | 939159 | A | 10/1963 |
| JP | 2003299193 | A | 10/2003 |
| JP | 2013013021 | A | 1/2013 |
| WO | 2010004815 | A1 | 1/2010 |
| WO | 2019121266 | A1 | 6/2019 |
| WO | 2019192808 | A1 | 10/2019 |
| WO | 2019192816 | A1 | 10/2019 |
| WO | 2020126847 | A1 | 6/2020 |
| WO | 2020234316 | A1 | 11/2020 |
| WO | 2020234317 | A1 | 11/2020 |
| WO | 2020239766 | A1 | 12/2020 |

OTHER PUBLICATIONS

Klippel, W. et al.: "Dynamical Measurement of the Effective Radiation Area SD", University of Technology Dresden, Germany, KLIPPEL GmbH, Dresden, Germany, 9 pages.

Sefar: "Fabric solutions for Acoustic devices and components", Sefar AG, Heiden, Switzerland, 3 pages.

SAATI: "Acoustex HD", Product News, SAATI S.p.A, Appiano Gentile (CO), Italy, Jun. 20, 2019, http://www.saati.com/sites/default/files/elemento-download/ACOUSTEX%20HD_4.pdf, 2 pages.

CNIPA, First Office Action for corresponding Chinese Patent Application No. 2021800212126 issued on Jun. 29, 2024, 13 pages.

* cited by examiner (Prior Art)

(Prior Art)

LOUDSPEAKER

CROSS REFERENCE TO RELATED APPLICATIONS

This application is a U.S. National Stage Application of International Patent Application No. PCT/EP2021/056561 entitled “LOUDSPEAKER” filed on Mar. 15, 2021, which claims priority from United Kingdom Patent Application No. 2004076.2 entitled “LOUDSPEAKER” filed on Mar. 20, 2020, the entire contents and elements of all of which are herein incorporated by reference for all purposes.

FIELD OF THE INVENTION

The present invention relates to loudspeakers.

BACKGROUND

There is an ongoing trend in the automotive industry to integrate loudspeaker in car-seats to create local sound zones for each passenger. This allows for personalized messages and individual music choice for each individual passenger. For increased speech intelligibility and quality of music reproduction it is desirable to have high acoustic contrast between the seats. In this way, the sound produced at one seat does not disturb the listening experience of the listener in other seats. Bringing the speakers as close to the listener’s ears as possible is one way to increase acoustic contrast.

There is, however, a natural limit to how close the loudspeakers can be mounted to the listener’s ears. For example, integrating loudspeakers 1*a*, 1*b* in forward-protruding wings of a car headrest, i.e. so the loudspeakers are alongside the head of a user as shown in FIG. 1*a*, can lead to decreased freedom of motion, decreased field of view and listening fatigue. These negative effects of proximity of a closed structure partially surrounding the head is known as “jail effect” and are preferably avoided for the comfort of the passenger.

If the loudspeakers 1*a*, 1*b* are mounted in a headrest further away from a user’s ears as shown in FIG. 1*b*, the acoustic contrast is decreased.

The loudspeakers 1*a*, 1*b* of FIGS. 1*a*, 1*b* have a traditional loudspeaker design, in which a magnet unit (loudspeaker driver) is mounted in a closed box which separates sound produced by a first (forward-facing) radiating surface from interfering with sound produced by a second (backward-facing) radiating surface. This gives the loudspeaker monopole characteristic leading to the sound being radiated omnidirectionally (i.e. with similar amplitude in all directions) when the diameter of the diaphragm is small compared to the wavelength of sound being produced, as is approximately true for this sort of application (where the diameter of the diaphragm is typically in the range of 20-80 mm; and the wavelength is the classic telephone speech band of 300 Hz-3 kHz).

Mounting the loudspeaker in a closed box causes the cavity to act as an additional spring which increases the loudspeaker resonance frequency of the loudspeaker since the diaphragm can’t move so easily. At substantially below resonance frequency, mounting the loudspeaker in a closed box causes the radiated SPL (sound pressure level) to be lower for a constant voltage input. At the resonance frequency, mounting the loudspeaker in a closed box causes the SPL to increase. In other words, the transfer function (=SPL as a function of frequency at constant voltage) decreases at substantially below the resonance frequency, and increases at the resonance frequency.

To increases the ratio of radiated on-axis vs total radiated power, it is a well-known technique to use a loudspeaker 1 without cabinet as shown in FIG. 2*a*. This causes two distinct lobes to front and back leading to a figure of eight radiation pattern with decreased radiation (“necking”) at the sides. As the acoustic path length between first (forward-facing) and second (backward-facing) radiating surfaces is very short, the overall efficiency is low due to the acoustic short circuit (a flow from positive to negative pressure at each point in time leading to cancelation and decreased electro-acoustical conversion efficiency; or more colloquially, anti-sound from the back reaching and cancelling the sound at the front). A remedy to the low output efficiency is to increase of the path length between front and back of the diaphragm, e.g. by extending the cabinet shown in FIG. 2*a* in a rearward direction (not shown). However, this requires a large mechanical structure and does not solve the issue with the strong rear lobe effectively being as loud as the front lobe.

Loudspeakers whose diaphragms are large compared to the wavelength of sound they produce are directional. For Studio and Pro-Audio applications where the aim is to produce sound in the far-field (>1 meter), this is easy to achieve in the classic telephone speech band of 300 Hz-3 kHz, but difficult at low frequencies.

For pro-audio and studio applications and listening in the far-field of the loudspeaker it is known, at low frequencies, that a defined leakage of an otherwise closed but large cabinet can decrease the rear radiation lobe and lead to a cardioid radiation characteristic focusing the radiated sound power towards the listener. An example of this arrangement is shown in FIG. 2*b*. Here, a loudspeaker 1 driver is mounted with the back radiating into a cavity which is then ventilated via a flow resisting element 35. The combination of volume and flow resistance leads to an additional phase shift on top of the physical path length between front and rear of the diaphragm. Choosing the location of the flow resistive opening and the cabinet dimensions for such an arrangement is typically optimized for about one octave at bass frequencies, e.g. between 60 Hz and 120 Hz. At higher frequencies, the path length between sound produced by the first (forward-facing) and second (backward-facing) radiating surfaces becomes large compared to the wavelength and the radiation characteristic of the loudspeaker arrangement shown in FIG. 2*b* approaches that of a monopole.

For an arrangement of the type shown in FIG. 2*b*, the cabinet orifice area equipped with the flow resisting element 35 is typically sized similar to the radiating surface area of the loudspeaker driver. The materials typically used are thick sheets of foam, felt or the like. The present inventors have observer that high volume displacement through the flow resistance element can lead to unwanted blowing noise created by vortices at the pores or fibers of the flow resistance. As loudspeakers are typically listened to in the far-field and the flow resistance is often mounted at the back this is not a major concern for pro-audio and studio applications.

Loudspeakers for far-field listening application are typically equipped with a strong motor system for high mid-band sensitivity. This goes hand in hand with high electrical damping at the resonance frequency decreasing the output. Qes (electrical Q factor) values for such loudspeakers are typically in the range of 0.3 to 0.6.

The present inventors have observed another, typically undesired, property of the arrangement shown in FIG. 2*b* is the decrease in Qms (mechanical Q factor) of the built-in loudspeaker vs the loudspeaker drive unit alone. The friction at the flow resistance influences the back-radiation impedance of the loudspeaker, increases the mechanical losses and so decreases the output around the loudspeaker resonance frequency. While the Qms for the unboxed speaker may be >10 when built into a box with flow resistance Qms may drop to values below 1.

The present invention has been devised in light of the above considerations.

SUMMARY OF THE INVENTION

In a first aspect, the present invention provides:

A loudspeaker including:

- a diaphragm having a first radiating surface and a second radiating surface, wherein the first radiating surface and the second radiating surface are located on opposite faces of the diaphragm;
- a drive unit configured to move the diaphragm based on an electrical signal;
- a loudspeaker support structure, wherein the diaphragm is suspended from the loudspeaker support structure via one or more loudspeaker suspension elements;
- wherein the loudspeaker support structure encloses a volume configured to receive sound produced by the second radiating surface, wherein the loudspeaker support structure includes one or more regions of porous material having a specific airflow resistance in the range 300-5000 Pa·s/m, wherein the one or more regions of porous material are configured to allow sound produced by the second radiating surface to exit the volume enclosed by the loudspeaker support structure via the one or more regions of porous material.

A loudspeaker having such properties has been found by the present inventors to be capable of delivering sound in a mid-high frequency range (e.g. 300 Hz-3 kHz) that is highly directional, whilst suppressing blowing noises that might otherwise be distracting for a user whose ear(s) are located at a listening position that is near to the loudspeaker, e.g. as might be the case when the loudspeaker is mounted in a headrest.

The loudspeaker may be configured for use with an ear of a user located at a listening position that is near to the loudspeaker. For example, the loudspeaker may be configured for use with an ear of a user located at a listening position that is 50 cm or less (more preferably 40 cm or less, more preferably 30 cm or less, more preferably 25 cm or less, more preferably 20 cm or less, more preferably 15 cm or less) from the first radiating surface of the diaphragm.

The loudspeaker may be configured to be mounted in a seat assembly, e.g. by being mounted in a headrest included in a seat assembly (e.g. as discussed in connection with the second aspect of the invention, below). The seat assembly may be configured for use in a vehicle. Mounting the loudspeaker in a seat assembly is one way in which the loudspeaker could be configured for user with an ear of a user located at a listening position that is near to the loudspeaker, e.g. as described above.

Specific airflow resistance reflects the air resistance per surface area of a material, and is independent of thickness (two pieces of material having different thicknesses may have the same specific airflow resistance). The specific airflow resistance of the region of porous material may be measured in accordance with ISO 9053.

ISO 9053 sets out standard methods (Method A or Method B) for conducting airflow measurements to measure Airflow Resistance—R [Pa·s/m$^3$], Specific Airflow Resistance—Rs [Pa·s/m], and Airflow Resistivity—r [Pa·s/m$^2$] for a material sample having a given surface area (S) and thickness (t). Such measurements are discussed in more detail in GB1908551.3 (under the heading “Airflow resistance measurements”).

In some cases, the one or more regions of porous material have a specific airflow resistance in the range 300-4000 Pa·s/m.

Preferably, the one or more regions of porous material have a specific airflow resistance in the range 500-3000 Pa·s/m. As can be seen from the experimental data below, this has range has been found especially preferable to provide sound in a mid-high frequency range (e.g. 300 Hz-3 kHz) that is highly directional, whilst suppressing blowing noises.

A skilled person would appreciate that useful embodiments can be found across the full range of specific airflow resistance values referred to above, albeit other elements of the loudspeaker would need to be adapted accordingly. For example, at the lower end of the range of specific airflow resistance values (e.g. 300 or 500 Pa·s/m), the enclosed volume of the supporting structure and the surface area of porous material would need to be small enough to avoid the loudspeaker acting as a dipole (see FIG. 8*a*, below). At the upper end of the range of specific airflow resistance values (e.g. 3000 or 5000 Pa·s/m), the enclosed volume of the supporting structure and the surface area of porous material would need to be large enough to avoid the loudspeaker acting as a closed box (see FIG. 8*d*, below)

The loudspeaker support structure preferably includes a rigid frame from which the diaphragm is suspended via one or more loudspeaker suspension elements.

The one or more regions of porous material may be formed by a material having a specific airflow resistance in an above-stated range (e.g. 300-5000 Pa·s/m, or 500-3000 Pa·s/m) which covers one or more openings in the rigid structure.

Preferably, the magnet unit is directly attached to, or forms at least part of, the rigid frame from which the diaphragm is suspended via one or more loudspeaker suspension elements.

Examples in which the magnet unit forms at least part of the rigid frame from which the diaphragm is suspended are particularly preferred, as it helps ensure a compact loudspeaker, which is advantageous where the loudspeaker is to be mounted in a headrest.

In examples in which the magnet unit forms at least part of, the rigid frame from which the diaphragm is suspended, one or more (of the one or more) regions of porous material may be formed by a material having a specific airflow resistance in an above-stated range (e.g. 300-5000 Pa·s/m, or 500-3000 Pa·s/m) which covers one or more openings in the magnet unit.

The volume enclosed by the loudspeaker support structure is preferably at least 5 cm$^3$, more preferably at least 8 cm$^3$, more preferably at least 10 cm$^3$, and in some examples could be 20 cm$^3$ or more. This is significantly more than the volume typically enclosed by a headphone loudspeaker, for example.

The volume enclosed by the loudspeaker support structure is preferably less than 5 litres, more preferably less than 1 litre, more preferably less than 100 cm$^3$. This is significantly less than the volume typically enclosed by the loudspeakers typically used in pro-audio applications, such as that shown in FIG. 2*b*, for example.

The effective radiating area of the diaphragm $S_D$ may be in the range 5 $cm^2$-50 $cm^2$.

As is known in the art, for a diaphragm having a circular perimeter which is suspended from a loudspeaker support structure by a roll suspension having an outer diameter $d_o$ and an inner diameter $d_i$, the effective radiating area of the diaphragm may be estimated as $$S_D = \pi\left(\frac{d}{2}\right)^2,$$

where d is the half-diameter of the roll suspension $(d_o+d_i)/2$.

Alternatively, or for more complex diaphragm geometries, the effective radiating area of the diaphragm $S_D$ could be measured using known techniques, see e.g. "Dynamical Measurement of the Effective Radiating area SD", Klippel GmbH (https://www.klippel.de/fileadmin/klippel/Files/Know_How/Application_Notes/AN_32_Effective_Radiation_Area.pdf).

Preferably, the surface area of the one or more regions of porous material (combined surface area, if there are multiple regions) is at least 80% of the effective radiating area of the diaphragm $S_D$, more preferably at least 100% of the effective radiating area of the diaphragm $S_D$, more preferably at least 200% of the effective radiating area of the diaphragm $S_D$. In some cases, the surface area of the one or more regions of porous material could be 500% or more of the effective radiating area of the diaphragm $S_D$. Having a larger surface area of the one or more regions of porous material helps to reduce blowing noises.

From the above considerations, it can be seen that for a loudspeaker suitable for mounting in a headrest, the surface area of the one or more regions of porous material (combined surface area, if there are multiple regions) may be in the range 10 $cm^2$ to 250 $cm^2$, and in some cases may be in the range 10 $cm^2$ to 100 $cm^2$.

The loudspeaker is preferably a mid-high frequency loudspeaker configured to produce sound across a designated frequency band. The designated frequency band may include at least 500 Hz-2 kHz, more preferably 300 Hz-3 kHz, in some cases the designated frequency band may include 300 Hz-20 kHz, or even 150 Hz to 20 kHz.

The drive unit may be an electromagnetic drive unit that includes a magnet unit configured to produce a magnetic field in an air gap, and a voice coil attached to the diaphragm (typically via an intermediary coupling element, such as a voice coil former). In use, the voice coil may be energized (have a current passed through it based on the electrical signal) to produce a magnetic field which interacts with the magnetic field produced by the magnet unit and which causes the voice coil (and therefore the diaphragm) to move relative to the magnet unit along a principal axis of the loudspeaker. The magnet unit may include a permanent magnet. The voice coil may be configured to sit in the air gap when the diaphragm is at rest. Such drive units are well known.

The resonance frequency of the loudspeaker may be in the range 150 Hz to 500 Hz. Such resonance frequencies are desirable for a mid-high frequency loudspeaker as defined above.

The magnet unit may have a magnetic flux density in the air gap in the range 0.1 T to 0.5 T. This is weaker than would be required for far-field applications, but as can be seen from the discussions below, can provide a loudspeaker having a smooth frequency response at small listening distances.

Preferably, the loudspeaker has a Qes (electrical Q factor) that is 5 or more, more preferably more than 10. This defines a "weak" motor which, as can be seen from the experimental data below, can be beneficial for a loudspeaker used in close proximity to the ear of a user.

Preferably, the loudspeaker has a Qms (mechanical Q factor) that is 2 or less. This defines the damping provided by the one or more regions of porous material (plus contributions from other damping elements) which, as can be seen from the experimental data below, can be beneficial for a loudspeaker used in close proximity to the ear of a user.

Qes and Qms are well-defined parameters for characterizing a loudspeaker that are well-known in the art, and defined for example in the well-known papers by Thiele ("Loudspeakers in Vented Boxes, Parts I and II") and Small, R. H. ("Direct-Radiator Loudspeaker System Analysis").

Another known parameter is Qts (total Q factor) which is calculated as:

$$Qts=(Qms\times Qes)/(Qms+Qes)$$

The directivity of a loudspeaker can be defined via the following parameters, as defined in Acoustics, Beranek, L. L, McGraw-Hill, 1954:

Directivity factor Q(f): This is the ratio of the intensity on a designated axis of a sound radiator at a stated distance r to the intensity that would be produced at the same position by point source if it were radiating the same total acoustic power as the radiator.

Directivity index DI(f): This is expressed in dB as a value of the expression DI=10 log(Q).

Preferably a loudspeaker according to the first aspect of the invention has a directivity index within a designated frequency band (e.g. as defined above, e.g. 300 Hz-3 kHz) that is 3 dB or more, more preferably 3.5 dB or more, more preferably 4 dB or more. In some cases, the directivity index within a designated frequency band (e.g. as defined above, e.g. 300 Hz-3 kHz) may be 4.8 dB or more. The directivity index may be measured at a listening distance (distance to source) of 1 meter.

A perfect theoretical cardioid has a directivity index of 4.8 dB so a directivity index of 3 dB or more, or 4 dB or more, is a significantly directional loudspeaker. Here, we note for completeness that a loudspeaker can be more directional than a perfect theoretical cardioid and thus have a directivity index of substantially more than 4.8 dB, e.g. as shown in the experimental data of FIGS. 16 and 17 discussed below—such loudspeakers may be referred to as having "hyper cardioid" directivity. A loudspeaker would typically have a directivity index above 4.8 dB when the diaphragm becomes large compared with the wavelength.

A loudspeaker with a directivity index of around 4.8 dB (corresponding to a perfect theoretical cardioid) within a designated frequency band (e.g. as defined above, e.g. 300 Hz-3 kHz) may be preferred in some cases.

For avoidance of any doubt, the loudspeaker could have a glitch that causes the directivity index to drop below 4 dB at some single frequency within the designated frequency band (e.g. where a circumference of the loudspeaker support structure is in the range of the wavelength) whilst still being above 4 dB for substantially the entire designated frequency band. To avoid such glitches, the directivity index of the loudspeaker could be measured at the "standard" centre frequencies within the designated frequency band for ⅓$^{rd}$ octave bands as shown in FIG. 17 below, preferably in accordance with ISO 266 (which would mean measuring the directivity index at 315 Hz, 400 Hz, 500 Hz, 630 Hz, 800 Hz, 1 kHz, 1.25 kHz, 1.6 kHz, 2 kHz, and 2.5 kHz for a designated frequency band of 300 Hz-3 kHz). Alternatively, the directivity index of the loudspeaker could be measured across the full designated frequency band with a $\frac{1}{3}^{rd}$ octave smoothing as shown in FIG. 16 below.

Nonetheless, it is preferable for the loudspeaker to have a directivity index within a designated frequency band (e.g. as defined above, e.g. 300 Hz-3 kHz) that is above 4 dB for the entire designated frequency band (with no glitches).

Preferably, a loudspeaker according to the first aspect of the invention has, within a designated frequency band (e.g. as defined above, e.g. 300 Hz-3 kHz), an SPL (sound pressure level) measured on a principal radiating axis that is at least 6 dB higher than the SPL measured at the same listening distance (distance to source) at 180° to the principal radiating axis, for substantially the entire designated frequency band. In other words, a rearwards facing lobe (SPL positioned 180°) should be at least −6 dB relative to a forwards facing lobe over the designated frequency band. For these measurements, the SPL may be measured at a listening distance of 1 meter.

For avoidance of any doubt, the loudspeaker could have a glitch that causes the SPL difference (on principal axis vs 180° to the principal radiating axis) to drop below 6 dB at some single frequency within the designated frequency band whilst still being at least 6 dB for substantially the entire designated frequency band. To avoid such glitches, the SPL values of the loudspeaker could be measured at the "standard" centre frequencies within the designated frequency band for $\frac{1}{3}^{rd}$ octave bands, preferably in accordance with ISO 266 (which would mean measuring the SPL values at 315 Hz, 400 Hz, 500 Hz, 630 Hz, 800 Hz, 1 kHz, 1.25 kHz, 1.6 kHz, 2 kHz, and 2.5 kHz for a designated frequency band of 300 Hz-3 kHz). Alternatively, the SPL values could be measured across the full designated frequency band with a $\frac{1}{3}^{rd}$ octave smoothing.

Nonetheless, it is preferable for the loudspeaker to have, within a designated frequency band (e.g. as defined above, e.g. 300 Hz-3 kHz), an SPL measured on a principal radiating axis that is at least 6 dB higher than the SPL measured at the same listening distance at 180° to the principal radiating axis, for the entire designated frequency band. (with no glitches).

Preferably, the loudspeaker has a directivity index within a designated frequency band (e.g. as defined above, e.g. 300 Hz-3 kHz) that is 4 dB or more for substantially the entire designated frequency band AND has within that designated frequency band, an SPL measured on a principal radiating axis that is at least 6 dB higher than the SPL measured at the same listening distance at 180° to the principal radiating axis, for substantially the entire designated frequency band.

A second aspect of the invention may provide a seat assembly including one or more loudspeakers according to the first aspect of the invention.

The seat assembly may include a headrest, with the one or more loudspeakers being mounted in the headrest of the seat assembly. In some examples, the headrest may be removable from the remainder of the seat assembly. In other examples, the headrest may be integral with the remainder of the seat assembly. In some seats (e.g. shell seats for cars) the headrest can be integral with the remainder of the seat such that it is unclear where the backrest ends and the headrest starts.

The one or more loudspeakers being mounted in a headrest of a seat assembly is not a requirement of the invention since, for example, the one or more loudspeakers could be mounted in a seat assembly without a headrest, or could be mounted in a part of the seat assembly that is nota headrest (e.g. a backrest of the seat, e.g. an upper portion of such a backrest).

The seat assembly is preferably configured to allow sound produced by the first radiating surface of the/each loudspeaker according to the first aspect of the invention to propagate out of the seat assembly, e.g. via open or acoustically transparent portions.

Similarly, the seat assembly is preferably configured to allow sound produced by the second radiating surface of the/each loudspeaker according to the first aspect of the invention to propagate out of the headrest, e.g. via open or acoustically transparent portions.

The seat assembly may include:

a first loudspeaker according to the first aspect of the invention, wherein the first loudspeaker is located within the headrest for use with a first ear of a user located at a listening position that is near (e.g. 50 cm or less, more preferably 40 cm or less, more preferably 30 cm or less, more preferably 25 cm or less, more preferably 20 cm or less, more preferably 15 cm or less) from the first radiating surface of the diaphragm of the first loudspeaker;

a second loudspeaker according to the first aspect of the invention, wherein the second loudspeaker is located within the headrest for use with a second ear of a user located at a listening position that is near (e.g. 50 cm or less, more preferably 40 cm or less, more preferably 30 cm or less, more preferably 25 cm or less, more preferably 20 cm or less, more preferably 15 cm or less) from the first radiating surface of the diaphragm of the second loudspeaker.

The seat assembly may include one or more additional loudspeakers.

For example, the seat assembly may include one or more bass loudspeakers for producing sound at bass frequencies. Bass frequencies may include frequencies across the range 60-80 Hz, more preferably frequencies across the range 50-100 Hz, more preferably frequencies across the range 40-100 Hz. In some cases, the bass loudspeaker may additionally be for producing sound at higher frequencies than stated here, e.g. up to (or even beyond) 250 Hz, or 300 Hz. This may be useful if the loudspeaker(s) according to the first aspect of the invention is not good at producing sound below such frequencies.

Example loudspeakers which may be used as bass loudspeakers within the seat assembly are described, for example, in in WO2019/121266, WO2019/192808, WO2019/192816, GB1907267.7 (including any subsequent publications based on this application), GB1907267.7 (including any subsequent publications based on this application). Further disclosures relevant to providing a suitable bass loudspeaker are also disclosed in PCT/EP2019/084950 and GB1907610.8.

If the seat assembly includes one or more bass loudspeakers, then the loudspeakers according to the first aspect of the invention may be used as mid-high frequency units, e.g. operating over a frequency band that includes 300 Hz-3 kHz, more preferably 300 Hz-20 kHz.

If the seat assembly does not include one or more bass loudspeakers, then the loudspeakers according to the first aspect of the invention may be used as full-range frequency units (albeit within potentially limited low-frequency capability), e.g. operating over a frequency band that includes 60 Hz-3 kHz, more preferably 60 Hz-20 kHz.

A headrest of the seat assembly (if present, see above) may have a rigid headrest frame, e.g. including one or more mounting pins for mounting and rigidly attaching the headrest frame to a rigid seat frame as described below (such mounting pins are conventional in car headrests, where typically two mounting pins are used). The loudspeaker support structure of the/each loudspeaker according to the first aspect of the invention may be part of or fixedly attached to the rigid headrest frame.

Preferably, the seat assembly is configured to position a user who is sat down in a seat portion of the seat assembly such that an ear of the user is located at a listening position as described above.

Preferably, the seat assembly is configured to position a user who is sat down in a seat portion of the seat assembly such that a first ear of the user is located at a first listening position as described above whilst a second ear of the same user is located at a second listening position as described above.

The seat assembly may have a rigid seat frame. The loudspeaker support structure of the/each loudspeaker according to the first aspect of the invention may be part of or fixedly attached to the rigid seat frame.

The seat assembly may be configured for use in a vehicle such as a car (in which case the seat assembly may be referred to as a “car seat”) or an aeroplane (in which case the seat assembly may be referred to as a “plane seat”).

The seat assembly could be a seat for use outside of a vehicle. For example, the seat assembly could be configured for use at home, e.g. as a seat for use with computer games, a seat for use in studio monitoring or home entertainment.

In a third aspect, the present invention may provide a headrest as defined above in connection with a seat assembly according to the second aspect of the invention (without requiring any other aspect of the seat assembly). The headrest may be configured to be mounted in a seat assembly, e.g. a seat assembly according to the second aspect of the invention.

In a fourth aspect, the present invention may provide a vehicle (e.g. a car or an aeroplane) having a plurality of seat assemblies according to the second aspect of the invention.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Figure 1A:
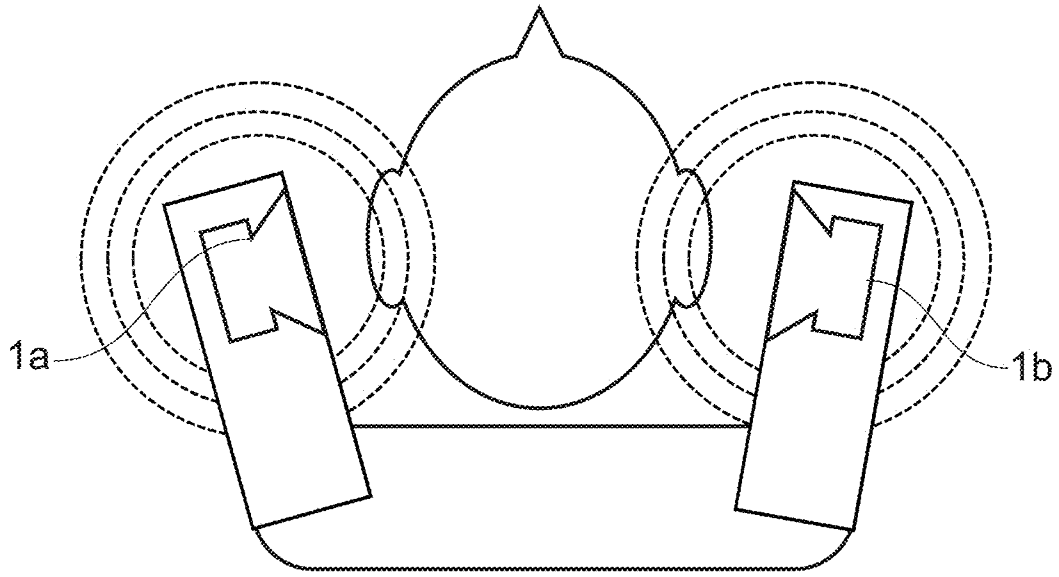
FIG. 1a (Prior Art)
FIG. 1*a* illustrates loudspeakers 1*a*, 1*b* integrated in the forward-protruding wings of a car headrest.
Figure 1B:
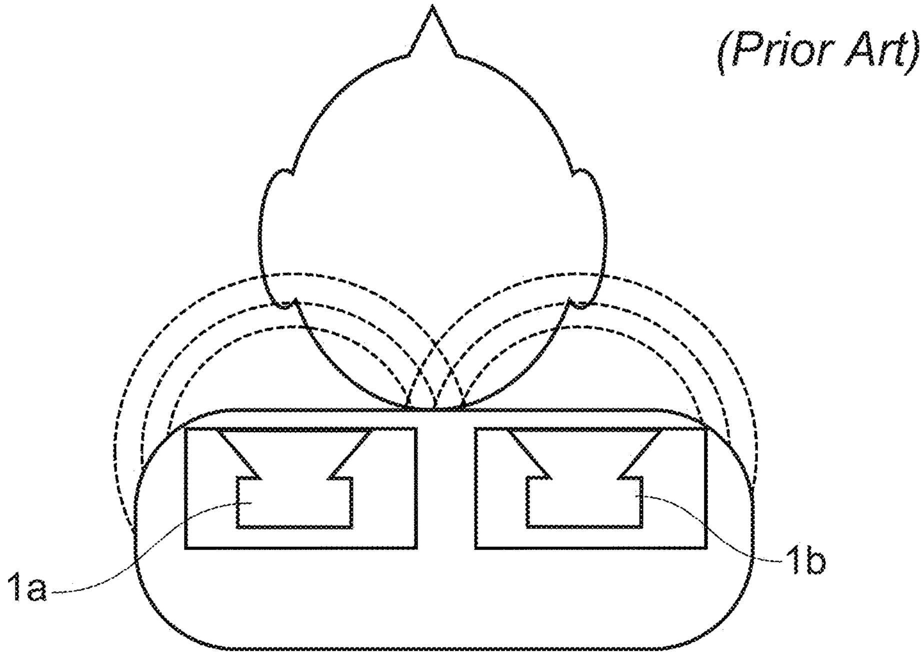
FIG. 1*b* illustrates loudspeakers 1*a*, 1*b* integrated in a car headrest without forward protruding wings.

Aspects and embodiments of the present invention will now be discussed with reference to the accompanying figures. Further aspects and embodiments will be apparent to those skilled in the art. All documents mentioned in this text are incorporated herein by reference.

The present inventors perceive there is a need for a loudspeaker for which the ratio between radiated energy on axis to total radiated energy is as high as possible. When used close to the ear of a listener, e.g. when incorporated into a car headrest, such a loudspeaker may allow for increased listening levels per user (passenger) with an increased distance between the user ears and the loudspeakers associated with their car seat, without disturbing other occupants of the car cabin. It is furthermore desirable that aforementioned ratio of on-axis to off-axis energy radiation is as high as possible over a wide frequency range, especially in the speech band between 300 Hz to 3 kHz where the human ear is very sensitive.

The loudspeaker may be capable reproducing frequencies above and below this classic speech band, e.g. working as a Mid-High unit up to 20 kHz, and would ideally have some low-mid capability down to 100 Hz. To extend the frequency range below the working range it could be combined with a bass (low frequency reproduction) loudspeaker.

It is furthermore desirable that the loudspeaker is compact, can be operated without the need for an additional back-volume and the adverse effects associated with an additional back-volume (and additional back-volume is an additional enclosed volume outside of the loudspeaker support structure, which causes the increased resonance frequency and overshoot of the transfer function as discussed above in relation to a classic closed box design).

It is also desirable that the loudspeaker is capable of being used for loud music playback (in a case where all occupants of the car are listening to the same music and mutual disturbance is no issue) yet remain low cost for mass market applications.

As can be seen from the background discussion above, despite there being existing loudspeaker technologies configured to increase the directivity index of a loudspeaker, all suffer significant drawbacks in the context of them being used in a headrest.

The loudspeakers described herein are intended for use in near-field listening, e.g. with the ear of a user located at a listening position that is 50 cm or less (more preferably 40 cm or less, more preferably 30 cm or less, more preferably 25 cm or less, more preferably 20 cm or less, more preferably 15 cm or less) from the first radiating surface of a diaphragm included in the loudspeaker. The loudspeakers may be used, for example, in a headrest.

Figure 3A:
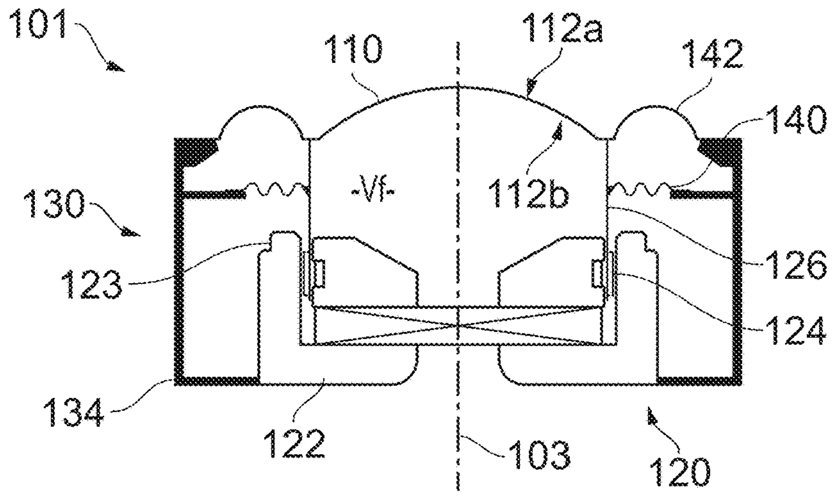
FIGS. 3*a-c* show a first loudspeaker according to the present disclosure.
Figure 3B:
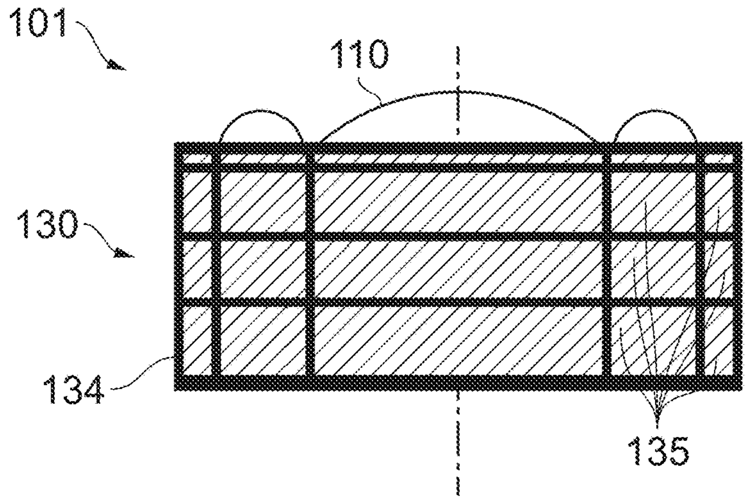
Figure 3C:
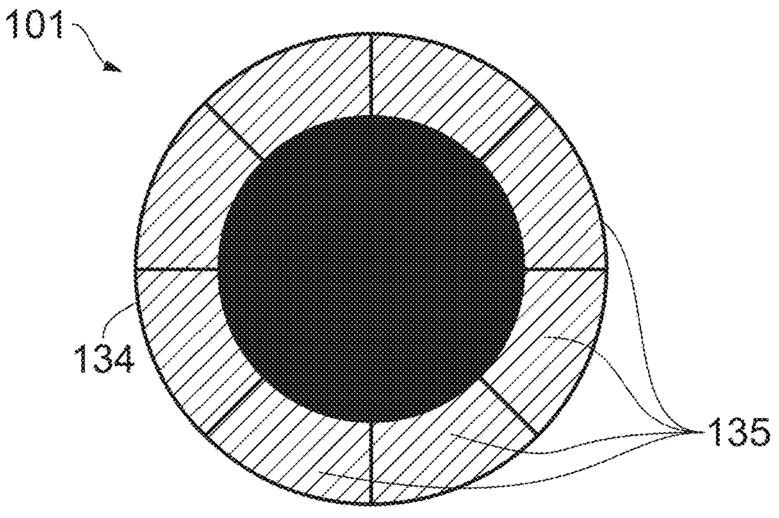

FIGS. 3*a-c* show a first loudspeaker 101 according to the present disclosure, with FIG. 3*a* showing a cross-section through the first loudspeaker 101 (side view), FIG. 3*b* showing the exterior of the first loudspeaker 101 (side view), and FIG. 3*c* showing the underside of the first loudspeaker 101 (bottom view).

The loudspeaker 101 includes a diaphragm 110 having a first (forward-facing) radiating surface 112*a* and a second (backward-facing) radiating surface 112*b*, wherein the first radiating surface 112*a* and the second radiating surface 112*b* are located on opposite faces of the diaphragm 110.

The loudspeaker 101 also includes a drive unit 120 configured to move the diaphragm 110 based on an electrical signal.

The drive unit 120 is an electromagnetic drive unit that includes a magnet unit 122 configured to produce a magnetic field in an air gap, and a voice coil 124 attached to the diaphragm 110 via an intermediary coupling element, in this case a voice coil former 126. In use, the voice coil 124 may be energized (have a current passed through it based on the electrical signal) to produce a magnetic field which interacts with the magnetic field produced by the magnet unit 122 and which causes the voice coil 124 (and therefore the diaphragm 110) to move relative to the magnet unit along a principal axis 103 of the loudspeaker 101.

The loudspeaker 101 also includes a loudspeaker support structure 130, wherein the diaphragm 110 is suspended from the loudspeaker support structure 130 via one or more loudspeaker suspension elements 140, 142. The loudspeaker suspension elements 140, 142 are configured to cause the voice coil to sit in the air gap when the diaphragm is at rest. In this example, the loudspeaker suspension elements are a spider 140, and a roll suspension 142.

Together, the diaphragm 110, the voice coil 124 and voice coil former 126 form a 'moving' assembly.

Together, the magnet unit 122 and loudspeaker support structure 130 form a 'non-moving' assembly.

The loudspeaker support structure 130 encloses a volume Vf configured to receive sound produced by the second radiating surface 112*b* of the diaphragm 110.

The first radiating surface 112*a* of the diaphragm 110 is configured to produce sound which is directed out from the loudspeaker 101.

In this example, the loudspeaker support structure 130 includes multiple regions 135 of porous material having a specific airflow resistance in the range 300-5000 Pa·s/m, wherein the regions 135 of porous material are configured to allow sound produced by the second radiating surface 112*b* to exit the volume Vf enclosed by the loudspeaker support structure 130 via the one or more regions 135 of porous material.

The regions 135 of porous material have a specific airflow resistance in the range 300-5000 Pa·s/m, more preferably in the range 500-3000 Pa·s/m.

In this example, the loudspeaker support structure 130 includes a rigid frame 134 from which the diaphragm 110 is suspended via the loudspeaker suspension elements 140, 142. In this example, the magnet unit 122 is directly attached to the rigid frame 134 (rather than, for example, being attached to a cabinet to which the rigid frame 134 is attached). The rigid frame 134 has a generally thin and acoustically transparent mechanical structure, and connects the moving and non-moving assemblies.

In this example, the regions 135 of porous material are formed by a material having a specific airflow resistance in an above-stated range (e.g. 300-5000 Pa·s/m or 500-3000 Pa·s/m) which covers one or more openings in the rigid frame 134.

In this case, the material covering the one or more openings in the rigid frame 134 is a tightly woven cloth having a specific airflow resistance in an above-stated range. The cloth could cover the openings in a variety of ways, as would be understood by a skilled person. For example, the cloth could be ultrasonically welded to the rigid frame 134 (which may e.g. be made of plastic), the rigid frame 134 may be made by overmoulding plastic over the cloth. Heat staking and gluing, with the cloth being inside or outside the rigid frame 134 are all options.

A key difference between the first loudspeaker 101 shown in FIGS. 3*a-c* and a conventional loudspeaker is that the loudspeaker support structure 130 encloses an unusually large volume, in this example ~26 $cm^3$, and has an unusually large external surface area, for the effective radiating area of the diaphragm 110 (and for the chosen magnet unit size), and is covered by the material having a specific airflow resistance in an above-stated range.

The larger volume Vf enclosed by the supporting structure 130 of the first loudspeaker 101 shown in FIGS. 3*a-c* can be visualised by the indent 123 in the magnet unit 122 which was included for use in fixing the magnet unit 122 to a conventional (smaller) frame.

As can be seen from the discussion below, this combination of uncommonly large surface area of the loudspeaker support structure with regions of high flow resistance with respect to the effective radiating area of the diaphragm 110 leads to low flow velocities through the regions of high flow resistance whilst avoiding blowing noises that would be unpleasant for a user whose ear was near to the first radiating surface of the diaphragm 110. Moreover, the surface area of the regions of high flow resistance are chosen to obtain a desired tuning frequency to provide a desired cardioid radiation pattern, without getting blowing noises that would be unpleasant for a user whose ear was near to the first radiating surface of the diaphragm 110.

Figure 2A:
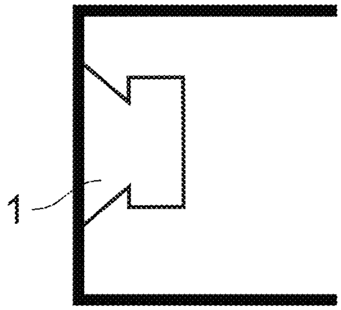
FIG. 2*a* illustrates a loudspeaker mounted without a cabinet.
Figure 2B:
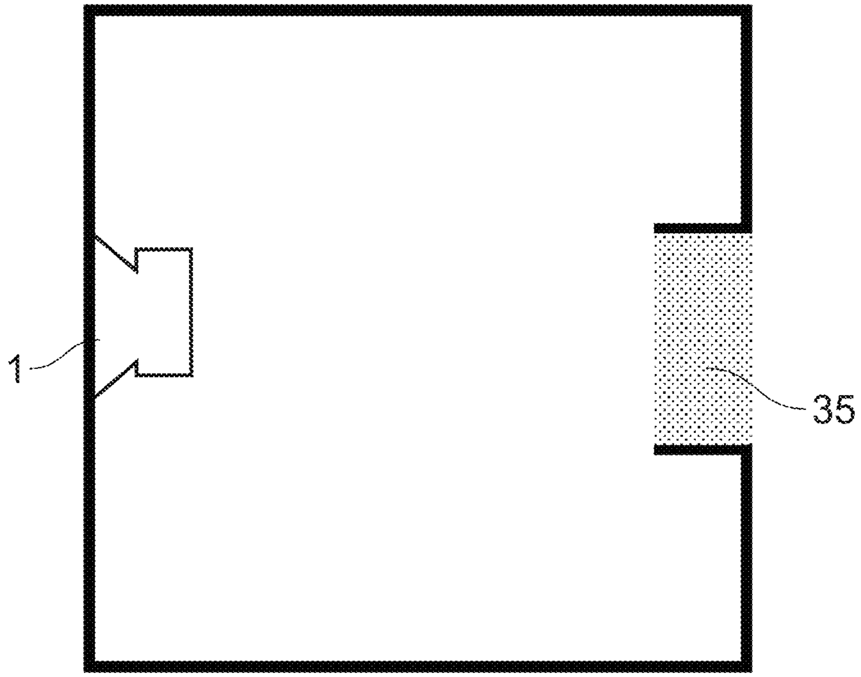
FIG. 2b (Prior Art)
FIG. 2*b* illustrates a loudspeaker mounted in a cabinet with a defined leakage.

Note that a similar desired tuning frequency (and cardioid pattern) could be achieved with a small hole and low flow resistance, but this would result in unpleasant blowing noises, see e.g. FIG. 2*b* in which a small orifice with relatively low flow resistance produces blowing noises that would be unpleasant to a user were the users to sit close to the loudspeaker (but a user would not sit close to the loudspeaker shown in FIG. 2*b* because it is generally designed for far-field use).

The first loudspeaker 101 is preferably a mid-high frequency loudspeaker configured to produce sound across at least a designated frequency band.

Figure 4A:
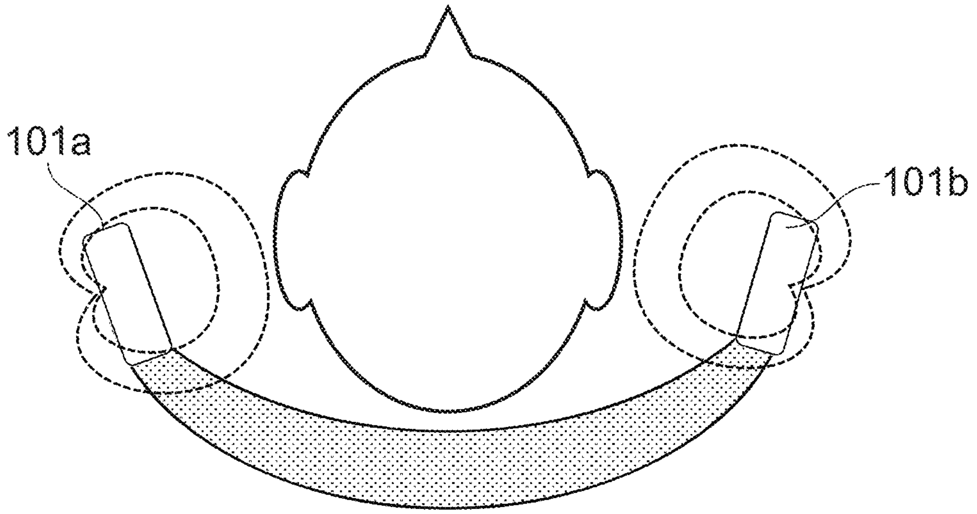
FIGS. 4*a-b* show example headrests including two of the first loudspeakers shown in FIGS. 3*a-c*.

FIG. 4*a* shows a first example headrest in which two of the first loudspeakers 101*a*, 101*b* are included. In this example, the first loudspeakers 101*a*, 101*b* are used as full-range loudspeakers (designated frequency band=100 Hz-20 kHz).

Figure 4B:
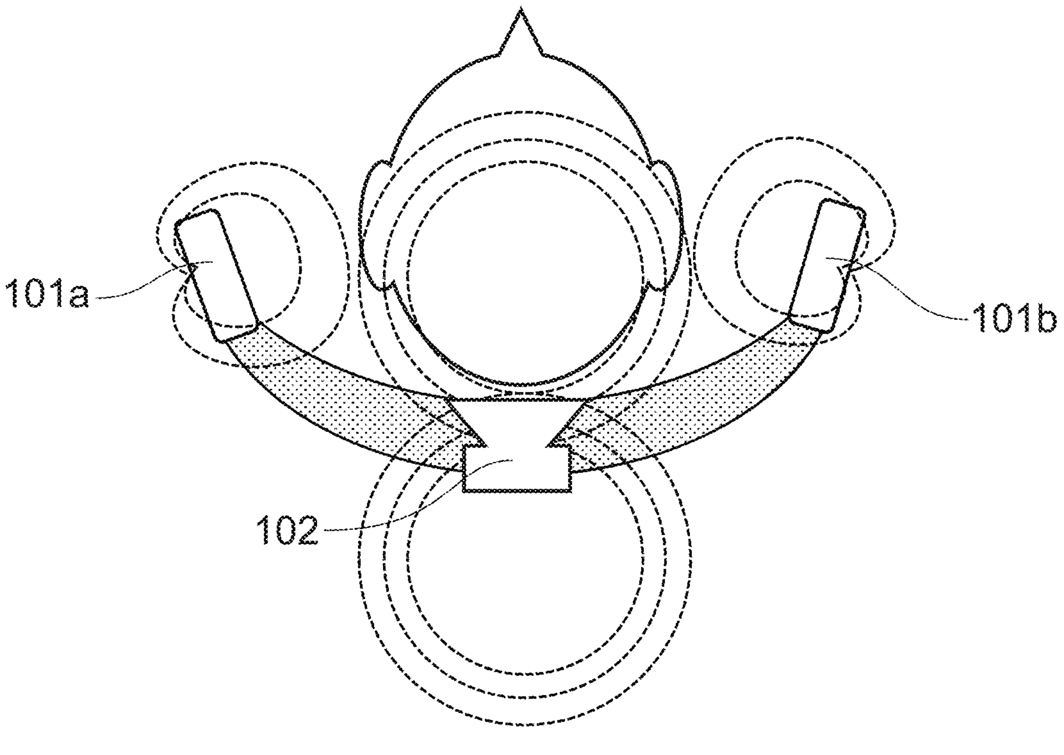

FIG. 4*b* shows a second example headrest in which two of the first loudspeakers 101*a*, 101*b* are included. In this example, the first loudspeakers 101*a*, 101*b* are used as mid-high loudspeakers (designated frequency band=300 Hz-20 kHz).

In the example shown in FIG. 4*b*, the headrest includes one or more bass loudspeakers 102 (here one bass loudspeaker 102 is shown) for producing sound at bass frequencies, e.g. across the range 50-100 Hz. Example loudspeakers which may be used as the bass loudspeaker 102 within the headrest (or a seat including the headrest) are described, for example, in WO2019/121266, WO2019/192808, WO2019/192816, GB1907267.7 (including any subsequent publications based on this application), GB1907267.7 (including any subsequent publications based on this application), in which applications it has been shown that it can be beneficial for a bass loudspeaker incorporated into a headrest to operate as a dipole. Further disclosures relevant to providing a suitable bass loudspeaker are also disclosed in PCT/EP2019/084950 and GB1907610.8.

In the example headrests shown in FIGS. 4*a* and 4*b*, the first loudspeakers 101*a*, 101*b* are included in the forward-protruding wings of a car headrest. In these examples, the frames of the loudspeakers 101*a*, 101*b*, 102 may be rigidly attached for a headrest frame, which may itself be configured to be rigidly attached to the frame of a seat (not shown).

The example headrests shown in FIGS. 4*a* and 4*b* may be included in a seat assembly configured to position a user who is sat down in a seat portion of the seat assembly such that a first ear of the user is located at a first listening position as described above whilst a second ear of the same user is located at a second listening position as described above.

Figure 5:
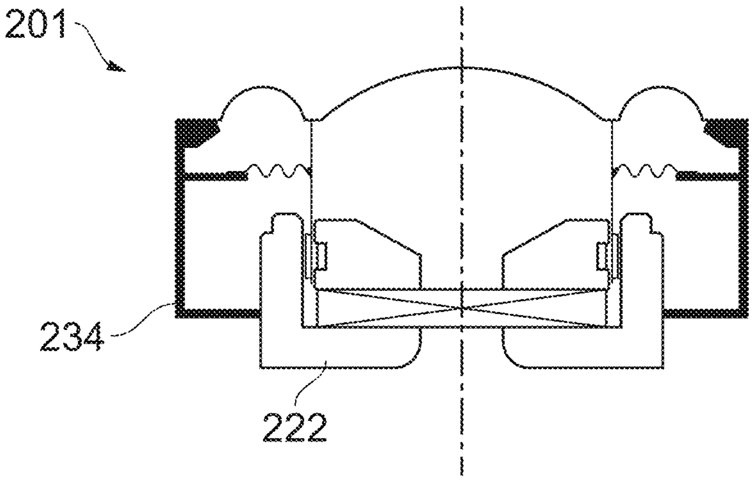
FIG. 5 shows a second loudspeaker according to the present disclosure.

FIG. 5 shows a second loudspeaker 201 according to the present disclosure, in cross-section (side view). Alike features corresponding to previous embodiments have been given alike reference numerals.

In the second loudspeaker 201 shown in FIG. 5, the magnet unit 222 protrudes out of the back of the rigid frame 234 (FIG. 5) allowing an increased volume Vf.

Figure 6:
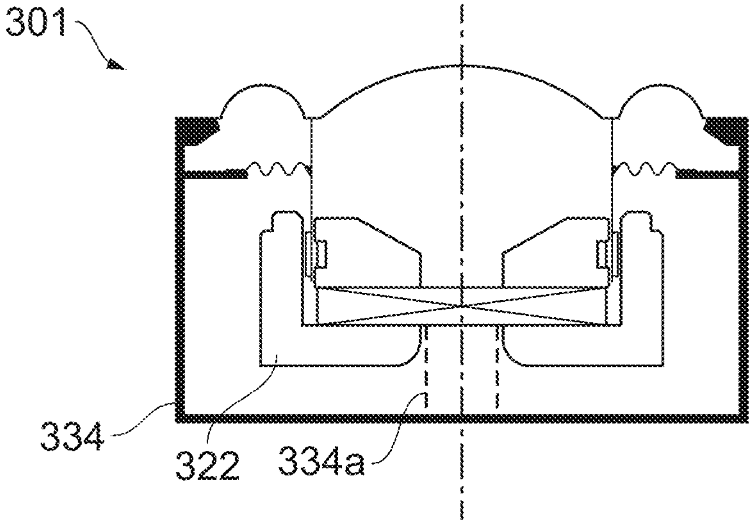
FIG. 6 shows a third loudspeaker according to the present disclosure.

FIG. 6 shows a third loudspeaker 301 according to the present disclosure, in cross-section (side view). Alike features corresponding to previous embodiments have been given alike reference numerals.

In the second loudspeaker 201 shown in FIG. 6, the magnet unit 322 is enclosed completely by the rigid frame 334, to allow for an increased surface area of porous material at the base of the loudspeaker. Here, the rigid frame 334 includes a portion 334*a* which holds the magnet unit rigidly in place above the base of the loudspeaker, to allow the base of the loudspeaker unit to include an increased surface area of porous material compared with the example shown in FIG. 3*c*.

Figure 7A:
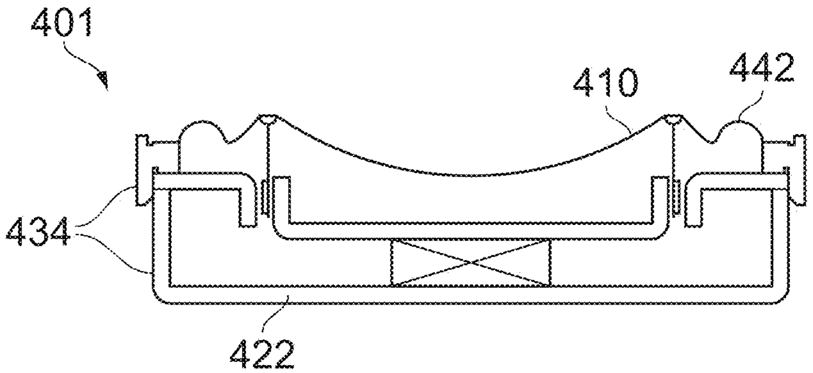
FIGS. 7*a-c* shows a fourth loudspeaker according to the present disclosure.
Figure 7B:
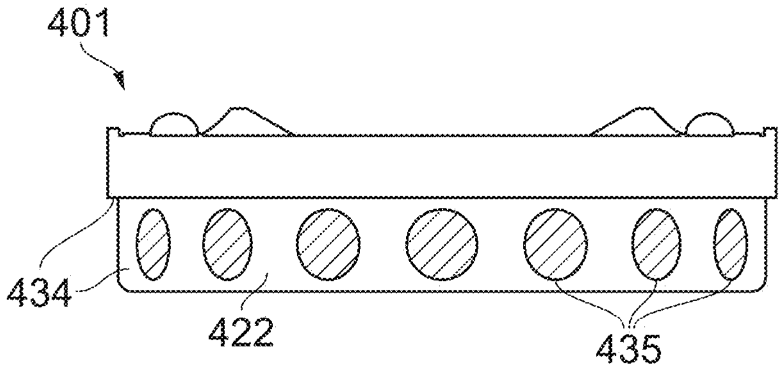
Figure 7C:
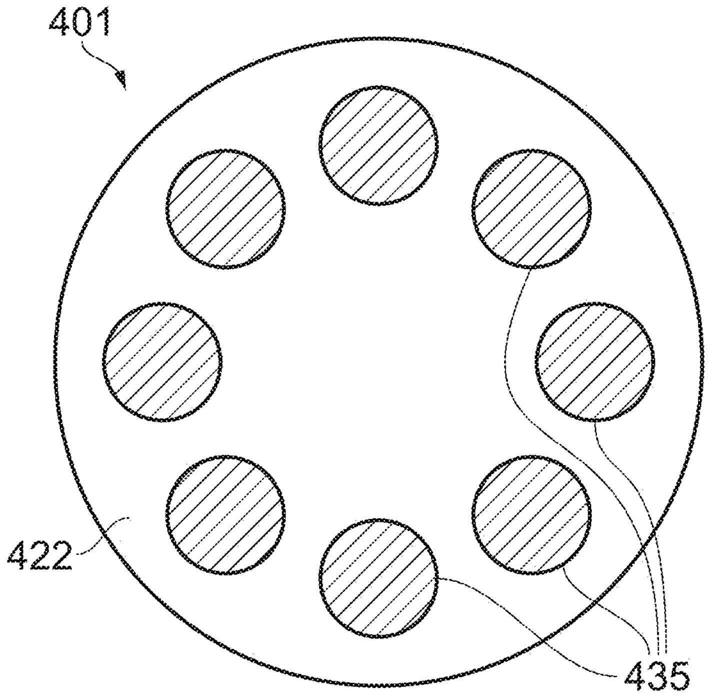

FIGS. 7*a-c* show a fourth loudspeaker 401 according to the present disclosure, with FIG. 7*a* showing a cross-section through the fourth loudspeaker 401 (side view), FIG. 7*b* showing the exterior of the fourth loudspeaker 401 (side view), and FIG. 7*c* showing the underside of the fourth loudspeaker 401 (bottom view). Alike features corresponding to previous embodiments have been given alike reference numerals.

In this example, the magnet unit 422 forms part of the rigid frame 434 from which the diaphragm is suspended via a loudspeaker suspension element 442 (in this example, the spider is omitted for compactness, but the roll suspension 442 is retained). In other words, the frame 434 and the magnet unit 422 are combined.

In this example, the regions 435 of porous material are formed by a material having a specific airflow resistance in an above-stated range (300-5000 Pa·s/m, or 500-3000 Pa·s/m) which covers one or more openings in the magnet unit 422 (note that in this example, the regions of porous material are shaded darker than the rigid frame, which is the opposite of the shading shown in previous figures).

In this example, the diaphragm 410 is chosen to have a low profile, and the volume Vf enclosed by the support structure 430 (the rigid frame 434, which in this example includes the magnet unit 422, covered by the material having the specific airflow resistance in an above-stated range) is ~10 $cm^3$, so this loudspeaker is more compact than that shown in FIGS. 3*a-c*, and the openings of porous material have a reduced surface area compared with the example shown in FIGS. 3*a-c*. Nonetheless, in view of the experimental data below, the present inventors believe that an adequate performance can nonetheless be obtained using such a loudspeaker.

In this example, the flux guiding components of the magnet unit 422 are made from a high permeability material such as soft iron with a cross-section that is large enough that the reluctance remains low despite the magnet unit having openings as described above. In this example, the openings in the magnet unit 422 are covered by the material from the inside, rather than the outside.

In the examples shown in FIGS. 3-7, the regions of porous material are formed by a cloth having a specific airflow resistance in an above-stated range, e.g. 300-5000 Pa·s/m or 500-3000 Pa·s/m, which covers one or more openings in a rigid frame.

The cloth is able to provide three functions: (i) to provide a defined mechanical resistance to allow for a magnet unit with high electrical Q; (ii) to provide a desired directivity (cardioid radiation pattern); and (iii) to prevent dust ingress into the interior volume of the loudspeaker, thereby decreasing the risk of debris in the airgap. In the case of the examples shown in FIGS. 3 and 6, the cloth also helps to protect the back of the loudspeaker.

Cloths having specific airflow resistances from about 5 Pa·s/m up to about 4000 Pa·s/m are commercially available in the field of acoustics, see for example:

"Fabric solutions for Acoustic devices and components" (Sefar) [full reference below] which discloses the availability of cloths from 5 to 3300 Pa·s/m (noting that units of specific airflow resistance are provided in this disclosure in 'Rayl (MKS)' which is the same as Pa·s/m in SI units).

"Product News—Acousstex HD" (Saati) [full reference below] which discloses the availability of cloths from 360 to 4000 Pa·s/m (noting that units of specific airflow resistance are provided in this disclosure in 'MKS Rayls' which is the same as Pa·s/m in SI units).

Typically such cloths are filter cloth formed of a very fine mesh.

Cloths having specific airflow resistances in the range 4000-5000 Pa·s/m are not common in the field of acoustics, but this is only because there is presently little commercial demand is for acoustic cloths in this range (the resulting flow is very low). However, such cloths are believed by the present inventor to be available for non-acoustic technical purposes, and in any case the present inventor believes it would be straightforward for a manufacturer of existing cloths to produce a cloth having specific airflow resistances in the range 4000-5000 Pa·s/m using existing techniques.

For completeness, we note that in existing automotive loudspeakers it is known to use a cloth, typically known as 'dust scrim', in order to decrease the risk of dust/debris entering in the airgap, and also to protect the back of the loudspeaker. Dust scrim usually has a very low specific airflow resistance, typically below 100 Pa·s/m, in order to provide acoustic transparency. Whereas for the examples shown in FIGS. 3-7, the cloths are chosen to have a generally higher specific airflow resistance (or a larger surface area) in order to provide a desired directivity (cardioid radiation pattern) without generating unpleasant blowing noises.

Experimental Data

Unless otherwise stated, the following experimental results were obtained for a loudspeaker having:

The structure of the first loudspeaker 101 shown in FIGS. 3*a-c* and described above, whose diaphragm had an effective radiating area $S_D$=8.8 cm2 (a radiating diameter of 3.4 cm), a volume Vf of 26 cm3.

A depth (in the direction of the principle axis 103) of 20 mm

An outer cloth diameter of 48 mm

Regions of porous material having a defined specific airflow resistance (formed by a cloth covering openings in the rigid frame 134) having a combined surface area of 32 $cm^2$. This combined surface area is taken here to be the sum of the area of the cylindrical outer surface of the cloth covering the rigid frame 134 as shown in FIG. 3*b* plus the area of cloth covering the backward-facing annular opening around the magnet unit (flush with the back of the loudspeaker) as shown in FIG. 3*c*. Note that the thin legs of the rigid frame 134 which can be seen in FIGS. 3*b* and 3*c* have been neglected for this calculation. The defined specific airflow resistance of the cloth used in the experimental results discussed below was varied as described below.

A magnetic flux density in the airgap of 0.55 T (referred to herein as a "strong" magnet unit)

FIGS. 8*a* to 8*d* are simulation results showing the influence of the cloth specific airflow resistance on the radiation pattern, whereby the left side of these plots shows the radiation pattern for 100 Hz, 200 Hz, 400 Hz only, and the right side of these plots shows the radiation pattern for 800 Hz, 1600 Hz, 3150 Hz only. In reality, the left side plots would be mirrored onto the right side (since the radiation patter is rotationally symmetric around the 0° axis), and the right side plots would be mirrored onto the left side, but this is not shown here for clarity.

Figure 8A:
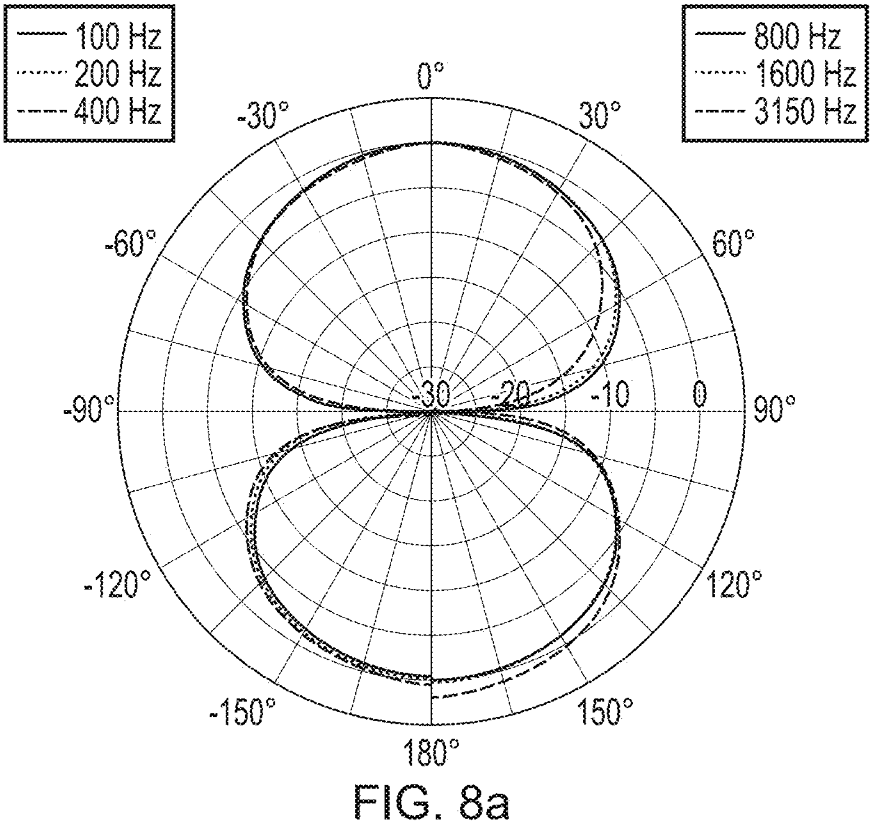
FIGS. 8-17 show experimental results.

In FIGS. 8*a-d*, the specific flow resistance of the cloth was chosen as follows:

FIG. 8*a* ("dipole" example): 0 Pas/m

Figure 8B:
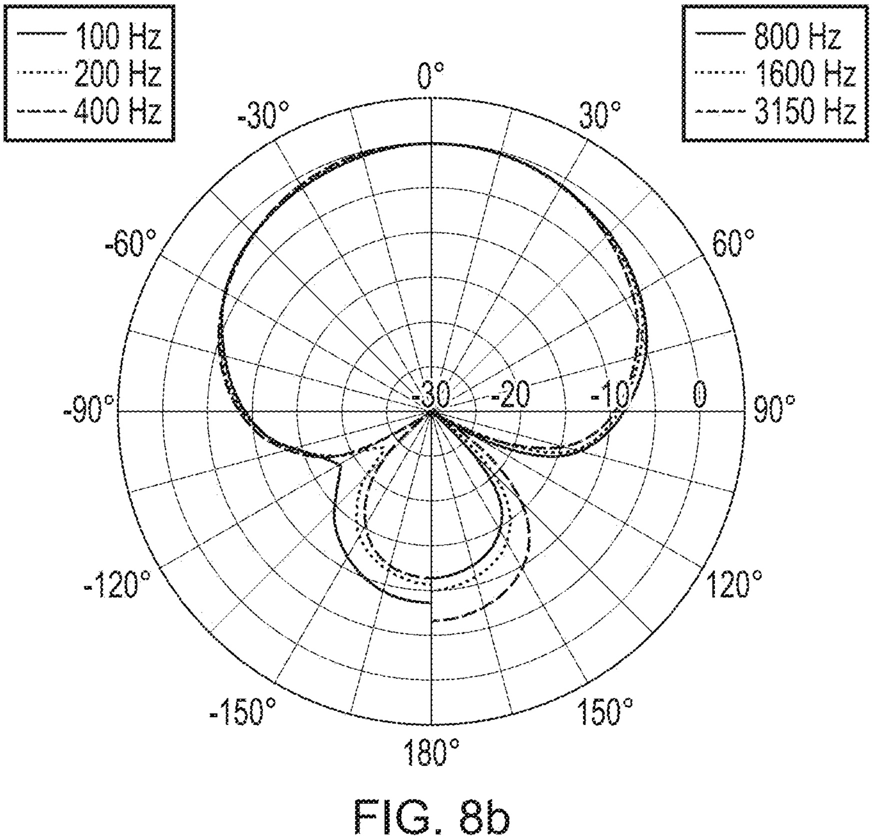

FIG. 8*b* ("hyper cardioid" example): 1000 Pa·s/m

Figure 8C:
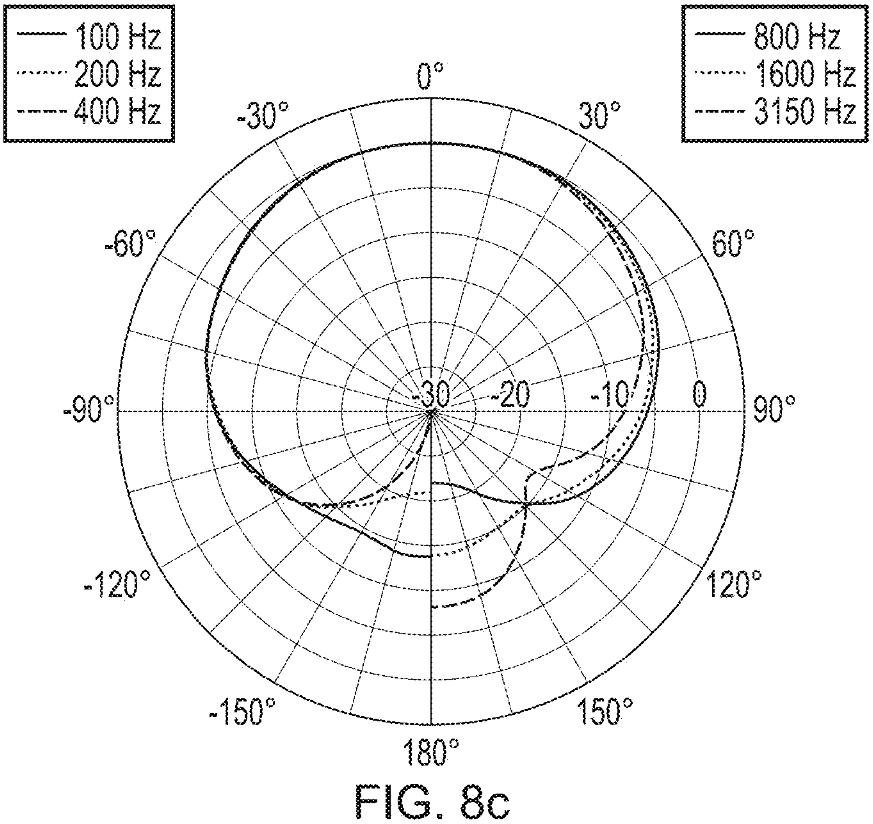

FIG. 8*c* ("cardioid" example): 1600 Pa·s/m

Figure 8D:
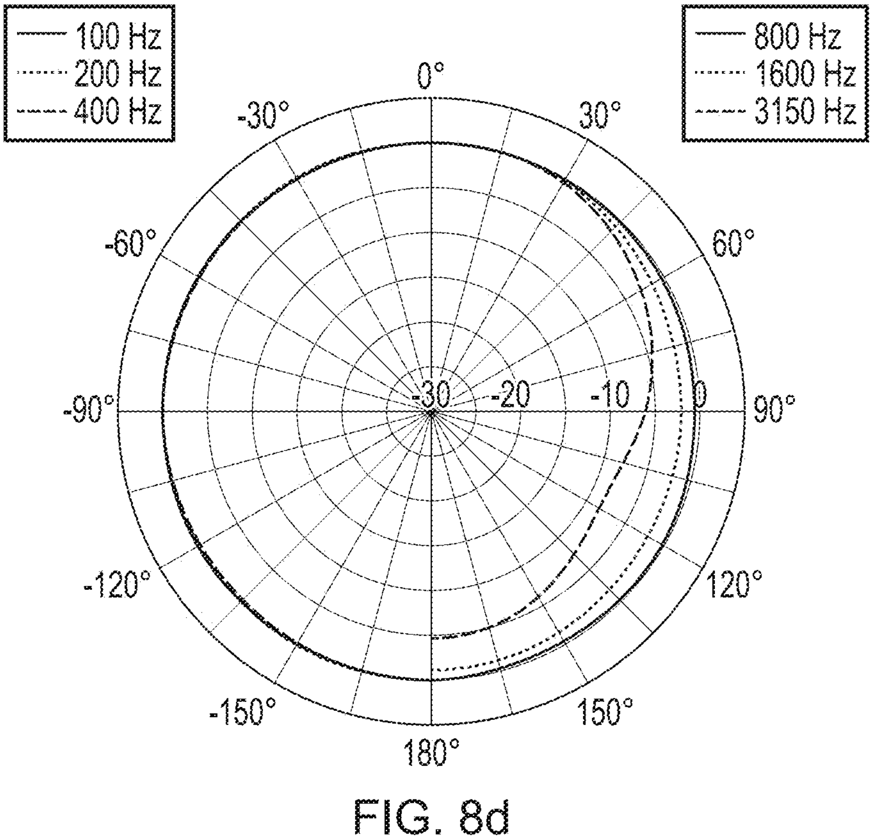

FIG. 8*d* ("closed box" example): 5000 Pa·s/m

For the plot of FIG. 8*a*, the specific airflow resistance (acoustic impedance) of the material is below the ideal range of specific airflow resistance for this particular loudspeaker configuration, meaning the directivity pattern follows the figure of 8 characteristic of a dipole over the whole frequency range. Here, the loudspeaker is effectively acting as a pure dipole with no monopole component as the acoustic impedance is almost negligibly small.

For the plot of FIG. 8*b*, the specific airflow resistance is increased to the range of 0.5-1 kPas/m, which is towards the lower end of the ideal range of specific airflow resistance for this particular loudspeaker configuration. This leads to a hyper cardioid directivity patterns as shown in FIG. 8*b*. Due to the increased acoustic impedance of the cloth the monopole component increases and the dipole component decreases. This directivity pattern may be desired for applications in which it is desired for attenuation at 120° or −120° to be maximized.

For the plot of FIG. 8*c*, the specific airflow resistance is increased to the range of 1-2 kPas/m, which is towards the upper end of the ideal range of specific airflow resistance for this particular loudspeaker configuration. This leads to a cardioid directivity patterns, with some hyper cardioid directivity towards higher frequencies, as shown in FIG. 8*c*. At 400 Hz the cardioid figure is ideal for certain applications, since at this frequency the monopole and dipole component are perfectly balanced, noting that the backward-facing lobe of the dipole is equally strong as the rearward radiation of the monopole but out of phase with respect to each other leading to perfect backwards cancellation.

FIGS. 8*b* and 8*c* show that both the hypercardioid and cardioid examples have, within a designated frequency band (here 100-3150 Hz), an SPL on a principal radiating axis that is at least 6 dB higher than the SPL at the same listening distance at 180° to the principal radiating axis, for substantially the entire designated frequency band The hyper cardioid and cardioid patterns of FIGS. 8*b* and 8*c* are both potentially useful, albeit for different purposes. Here it is noted that the cardioid patterns shown in FIG. 10*c* are generally more preferred, because it radiates the least to the 180° (backwards) direction. But for certain purposes, the hyper cardioid patterns shown in FIG. 10*b* may be more preferred, e.g. if another person (who did not want to hear sound produced by the loudspeaker) were at 120° or −120° with respect to the loudspeaker.

For the plot of FIG. 8*d* the specific airflow resistance is increased beyond 2 kPas/m, which is above the ideal range of specific airflow resistance for this particular loudspeaker configuration. Here, the directivity pattern approaches that of a monopole as shown in FIG. 8*d*. This is because the acoustic impedance of the cloth is so large that the airflow through the cloth becomes negligible and the support structure including the cloth effectively provides a closed box and the associated omnidirectional radiation.

Figure 9:
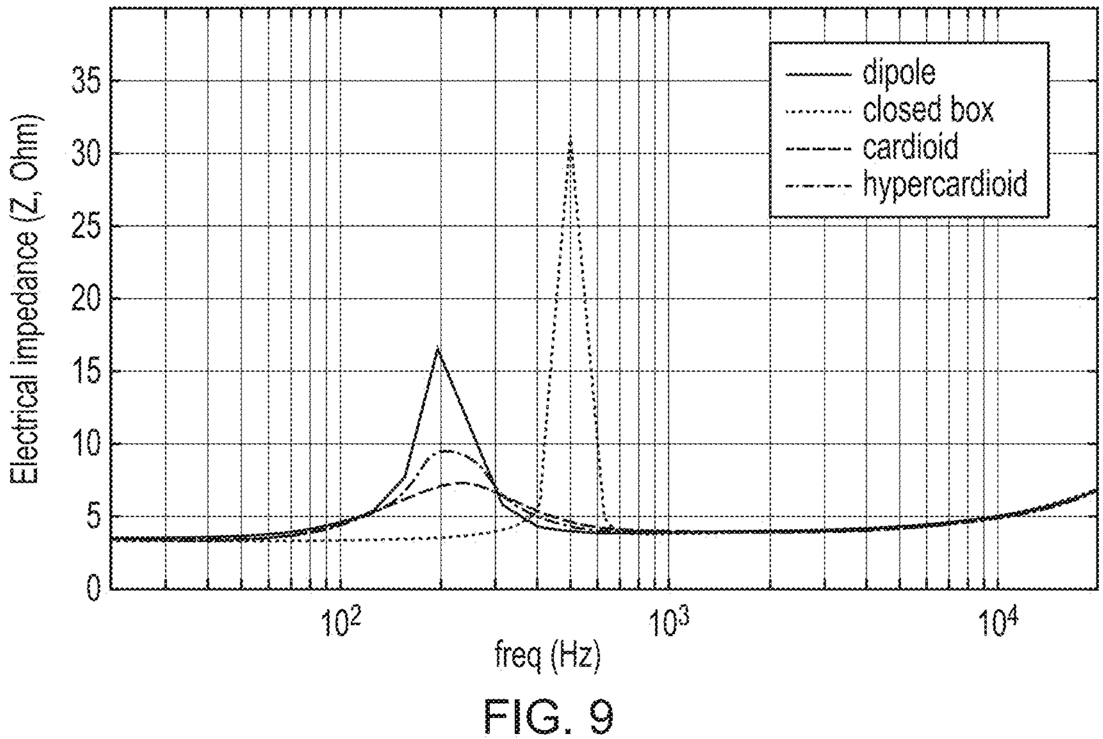

FIG. 9 shows the simulated electrical input impedance vs frequency corresponding to the specific airflow resistance value values discussed in relation to FIGS. 8*a-d*.

As shown here, in the dipole case (corresponding to FIG. 8*a*) the impedance peak corresponds to the loudspeaker free air resonance frequency fs. In the closed box case (corresponding to FIG. 8*d*) the resonance frequency fc is determined according the well-known formula for closed boxes, which is fc=fs*sqrt(Vas/Vb+1), also the total Q factor (Qts, defined above) of resonance shifts by the same factor sqrt(Vas/Vb−1), where Vas is the equivalent air compliance, and Vb is the box volume (which for our purposes corresponds to the internal volume enclosed by the supporting structure, referred to above as Vf). Vb is not trivial to determine as the textbook formula assumes an adiabatic volume whereas the volume inside the supporting structure is small with a large amount of isothermal surface of the magnet unit. The effective acoustic volume is larger than the geometrical volume mentioned above.

The higher resonance frequency and larger amplitude of resonance for the closed box case are not preferred.

In the hyper cardioid case (corresponding to FIG. 8*b*) and the cardioid case (corresponding to FIG. 8*c*), the resonance frequency does not shift up substantially compared to the dipole case, but the total Q factor (Qts) of the resonance is significantly decreased. This is due to the mechanical damping provided by the flow through the acoustic impedance covering the frame.

The cardioid and hyper cardioid cases have similar resonance frequency to the dipole (a good thing) and a lower resonance amplitude compared to dipole (also a good thing).

Figure 10:
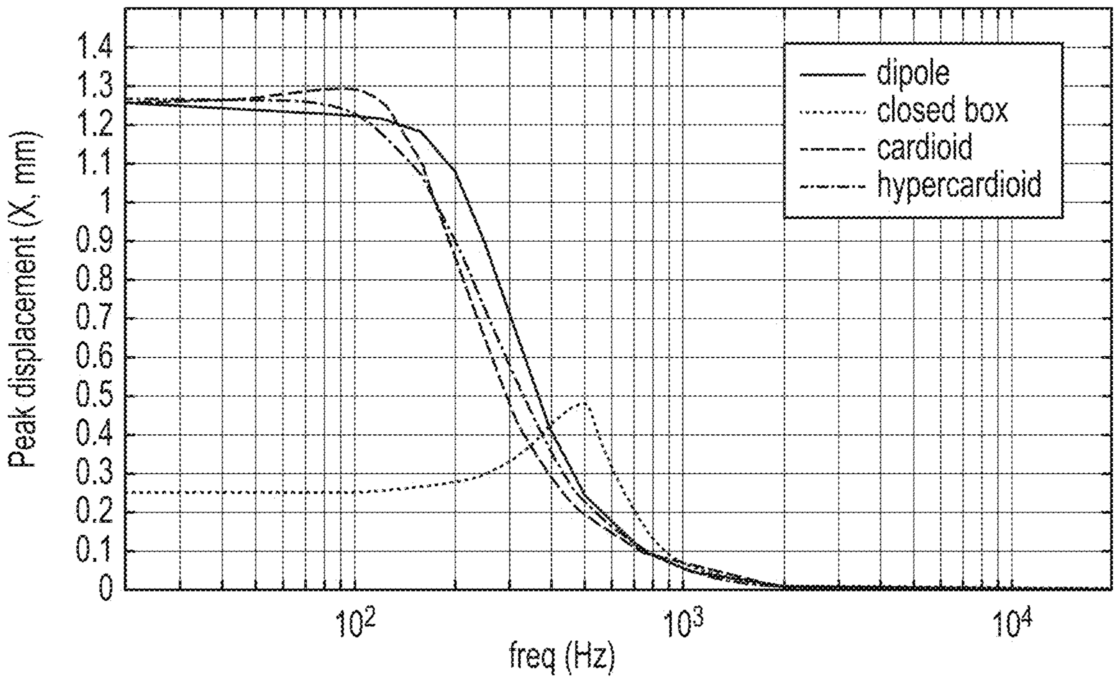

FIG. 10 shows the simulated peak displacement vs frequency for an input voltage of 2V rms corresponding to the specific airflow resistance value values discussed in relation to FIGS. 8*a-d*.

As can be seen from FIG. 10, only the closed box case stands out with the displacement being substantially lower and peaking higher in frequency, at the in-box resonance frequency fc.

Because the cardioid and hyper cardioid cases have larger peak displacement compared with closed box, a loudspeaker in such cases would need to allow for larger excursions, very much like free-air usage (dipole case).

In near-field applications where an ear of a user located at a listening position that is as close as 10 cm to the first radiating surface of the loudspeaker (vs >1 m for far-field applications), the required loudspeaker sensitivity may be substantially smaller, e.g. 90 dB/1 W/1 m (far-field) vs. 90 dB/1 W/10 cm (near-field).

The present inventors have observed that this opens up the possibility of equip the loudspeaker with a much weaker magnet unit as compared to a loudspeaker designed for far-field listening.

Figure 11A:
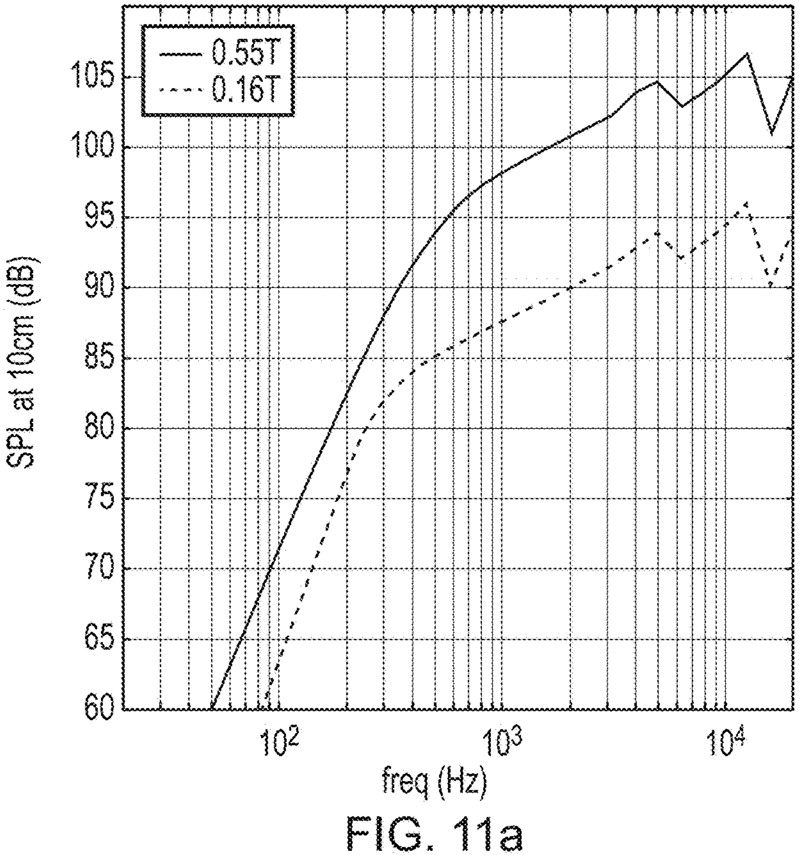
Figure 11B:
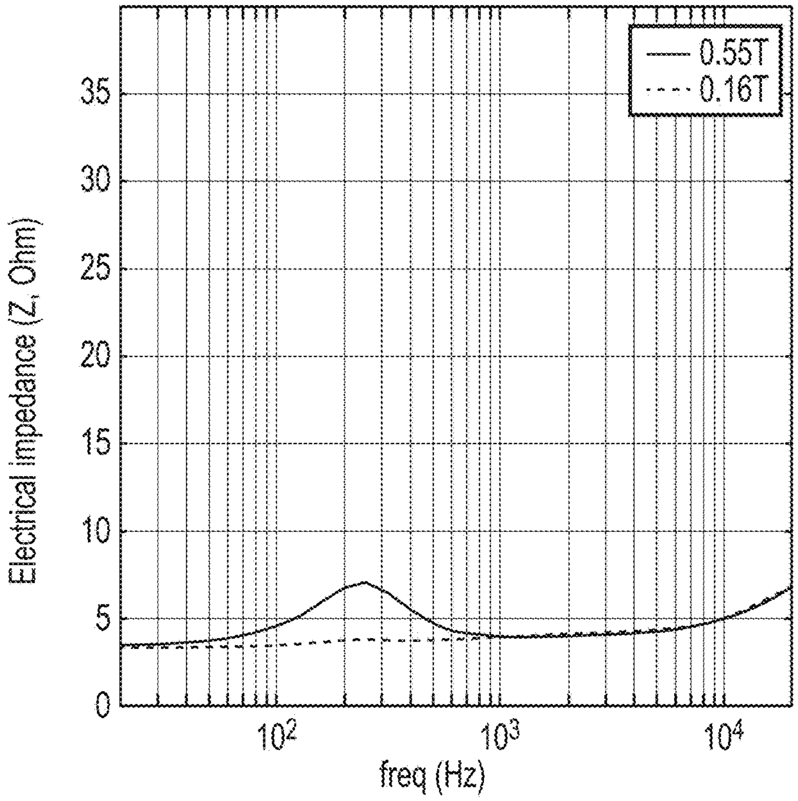

FIG. 11*a* shows the simulated frequency response (SPL) for a listening distance of 10 cm and FIG. 11*b* shows the simulated electrical input impedance with the frame covered with a cloth with specific airflow resistance of 1.8 kPas/m, with two different magnetic flux densities in the airgap: The solid curve corresponds to 0.55 T (referred to herein as a "strong" magnet unit), the dashed curve to a decreased magnetic flux density of only 0.16 T (referred to herein as a "weak" magnet unit). As expected, reducing flux density reduces SPL, particularly at higher frequencies (FIG. 11*a*). But reducing flux density also damps the impedance peak at resonance (FIG. 11*b*).

In more detail, for the weak magnet unit, the sensitivity for mid and high frequencies decrease about 20 dB but at around 200-300 Hz the loss is only 10 dB, due to the decreased electrical Q-factor. This leads to a more balanced frequency response and a very smooth electrical input impedance curve.

FIGS. 12-17 show (non-simulated) measurements from experimental work

Figure 12:
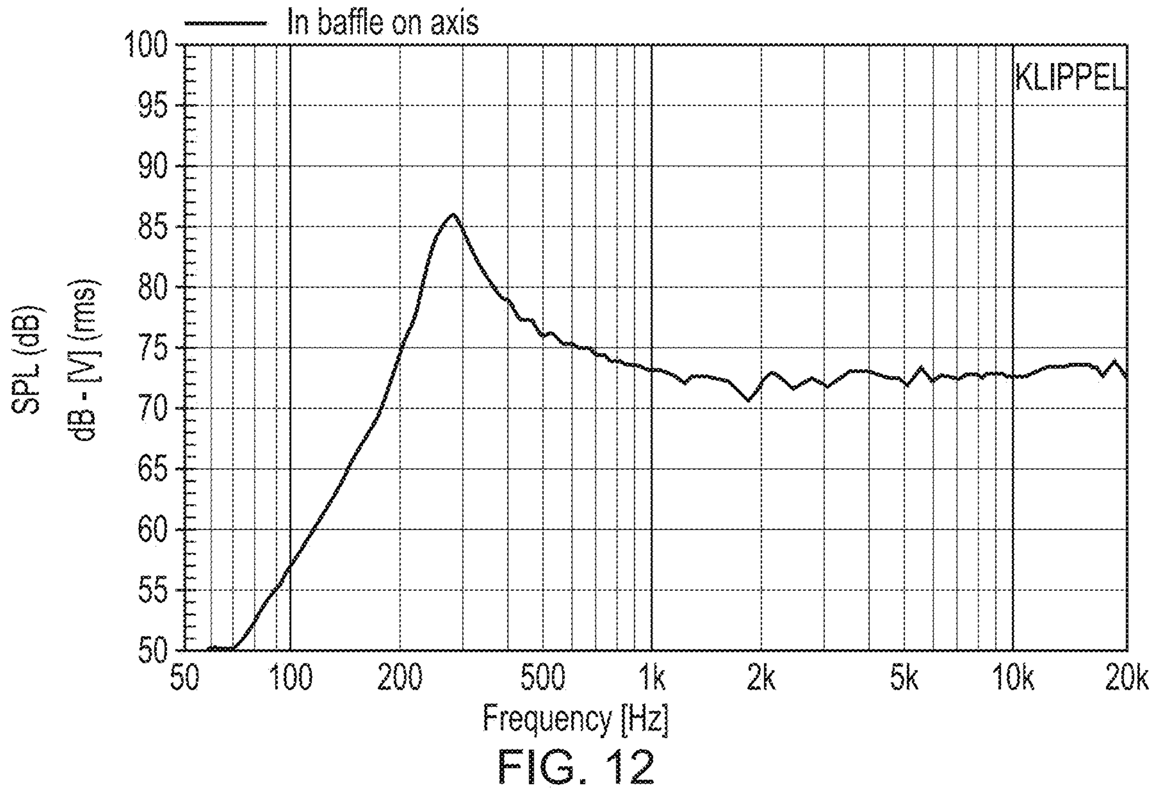

FIG. 12 shows, for a loudspeaker including a weak magnet unit as defined in relation to FIG. 11, a measurement carried out at a distance of 1 m with the loudspeaker mounted in an infinite baffle at 2V input voltage with the frame of the loudspeaker not covered with cloth. As can be seen, the weak magnet unit provides almost no back EMF leading to a very high electrical Q-factor and uncontrolled behavior at resonance frequency. Thus a huge peak can be seen at resonance (bad) and a low SPL at higher frequencies (also bad). Such a loudspeaker would be deemed unusable as the sound would be very boomy.

Figure 13:
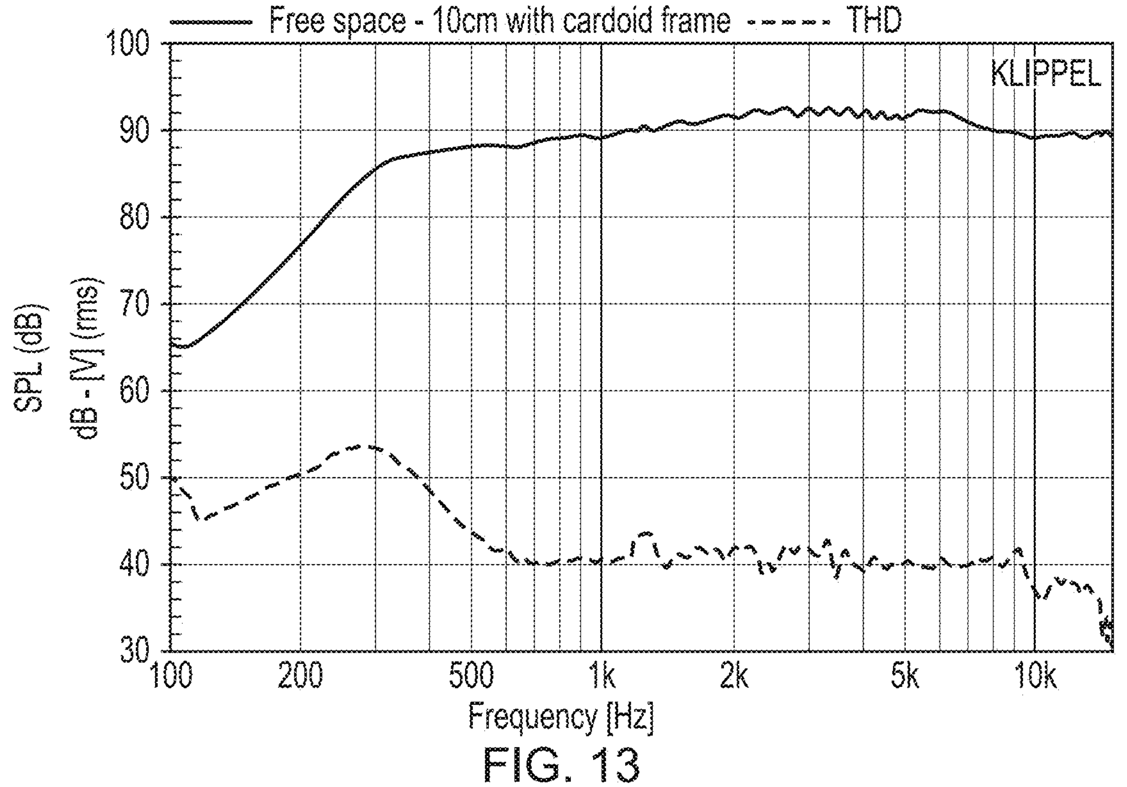

FIG. 13 shows the same loudspeaker (as described above in relation to FIG. 12) measured at 2V input voltage at a listening distance of 10 cm in free space where the frame is covered with a cloth having a specific airflow resistance of 1600 Pas/m (cardioid case). Here, the resulting frequency response is very smooth and total harmonic distortion (THD) is at remarkably low at −50 dB over the whole mid-high frequency band and only increases moderately towards low frequencies. The flow resistance is tuned to decrease the mechanical Q-factor and have it dominate over the back-emf effectively leading to a mainly mechanically damped loudspeaker and a smooth frequency response.

Thus, the combination of a weak magnet system combined with the use of the cloth having a specific airflow resistance of 1600 Pas/m (cardioid case) leads to a loudspeaker that is very useful at close range (though such a loudspeaker would not be particularly useful in far field).

The results for a stronger magnet unit (not shown) would be worse than those shown in FIG. 13 because the frequency response would be unbalanced. Around resonance frequency the stronger back-EMF would lead to additional electrical damping and decrease the output while at high frequencies the stronger motor would increase the sensitivity. So you would end up having too little at 300 Hz and too much at 3 kHz (and above).

Figure 14:
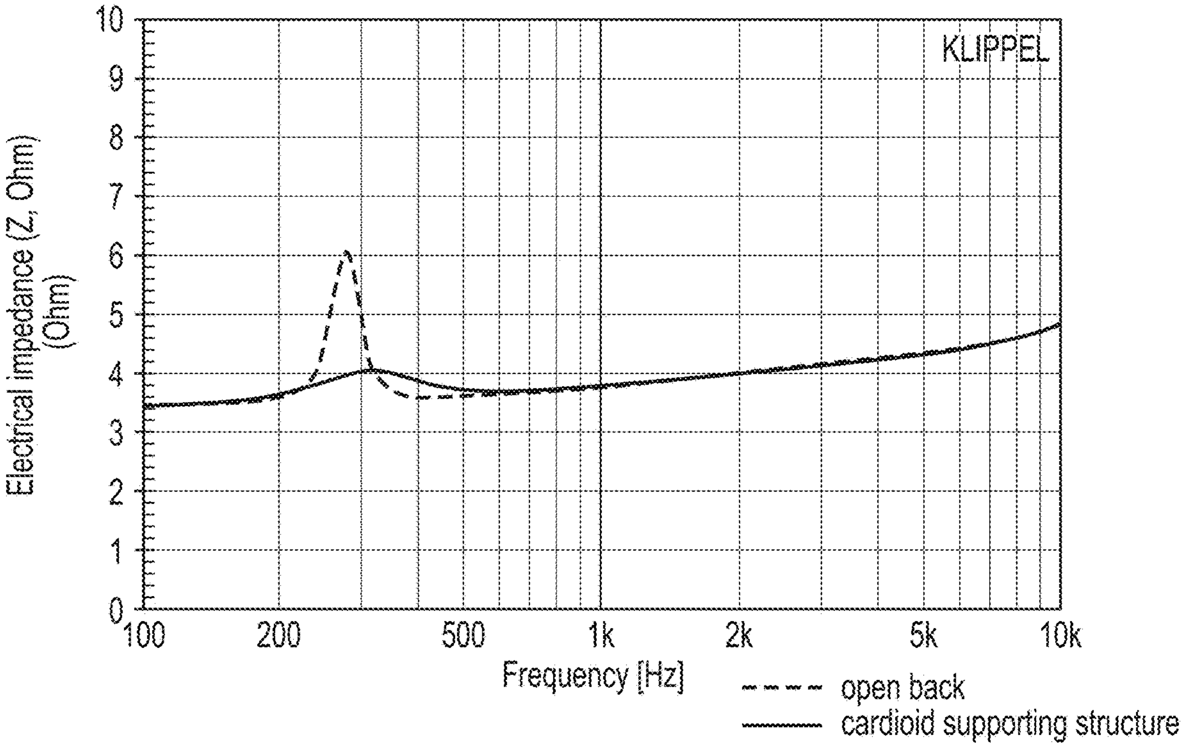

FIG. 14 shows the measured electrical impedance electrical input impedance vs frequency corresponding to the loudspeaker discussed in relation to FIG. 12 ("open back") and the loudspeaker discussed in relation to FIG. 13 ("with cardioid frame").

FIG. 14 illustrates that, due to the mechanical damping the electrical impedance curve of the loudspeaker is effectively flat through use of the cardioid supporting structure ("cardioid supporting structure") even at resonance frequency making it very easy to drive by any amplifier and even use passive filter components, compared with the case where the cardioid supporting structure is open ("open back"). Almost exclusive mechanical damping is not uncommon for small loudspeakers by usage of Ferrofluid, but the viscosity of (and hence the resulting damping provided by) Ferrofluid has a strong temperature dependence, whereas the flow resistance provided by the cardioid supporting structure is temperature independent and does not age.

Now it can easily be appreciated, that the mechanical Q-factor is an indicator for the suitability of the chosen cloth material for the given loudspeaker and open frame area size: If the flow through the cloth (=regions of porous material) is chosen appropriately, the mechanical Q-factor is low leading to strong dampening of the loudspeaker resonance and desired directivity pattern, whilst shifting the resonance frequency moderately upwards due to the additional monopole component.

Figure 15A:
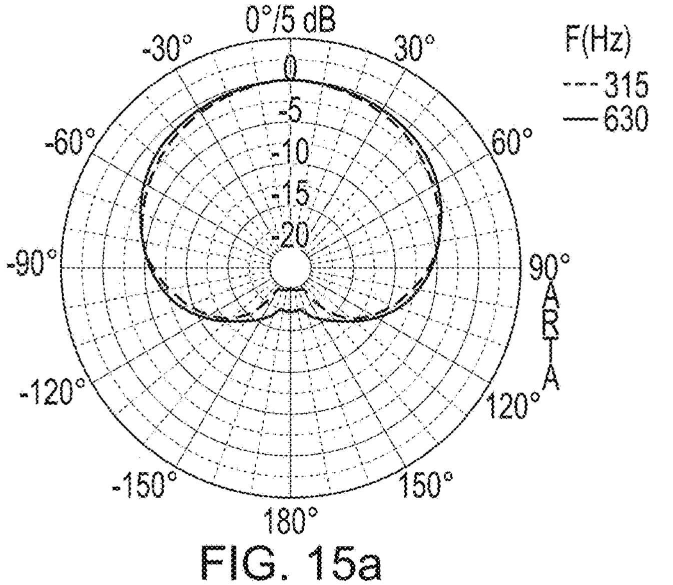
Figure 15B:
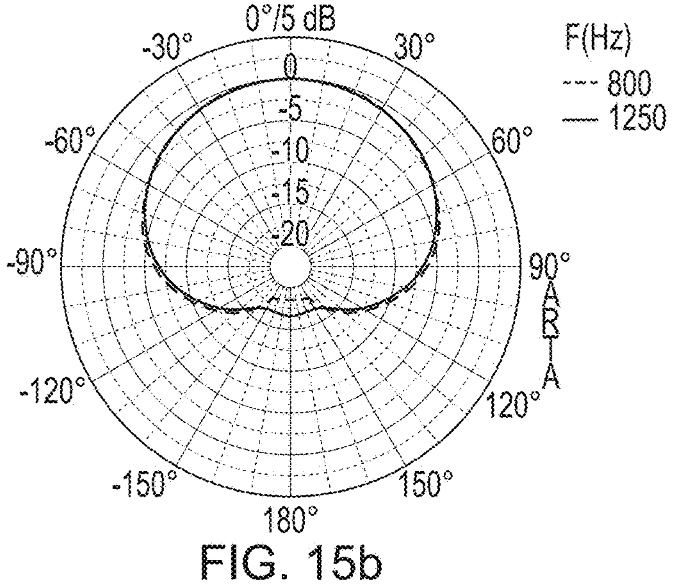
Figure 15C:
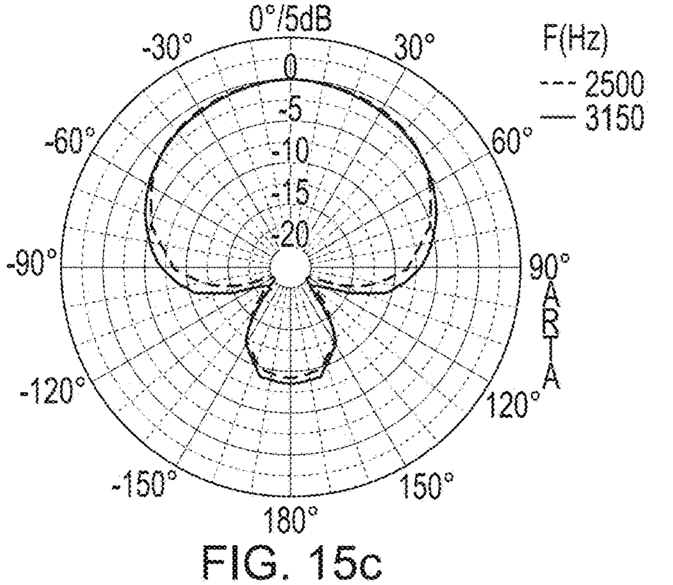

FIGS. 15*a*-*c* shows the measured the far-field directivity (listening distance=1 m) of the loudspeaker already described in relation to FIG. 13 ("cardioid supporting structure") at various frequencies (two frequencies per plot).

As shown by FIGS. 15*a*-*b*, in the frequency range from 300 Hz-1250 Hz (FIGS. 15*a*-*b*) the radiation pattern follows the cardioid characteristic. Towards the upper end of the relevant frequency band at 3150 Hz (FIG. 15*c*), the directivity shows a more hyper cardioid directivity pattern, as expected by simulation. For higher frequencies the directivity of the dome takes over as it becomes large compared to the wavelength and the power spectral density in music and speech decreases anyway. Hence, acoustic contrast from off-axis radiation becomes less of a concern.

Figure 16:
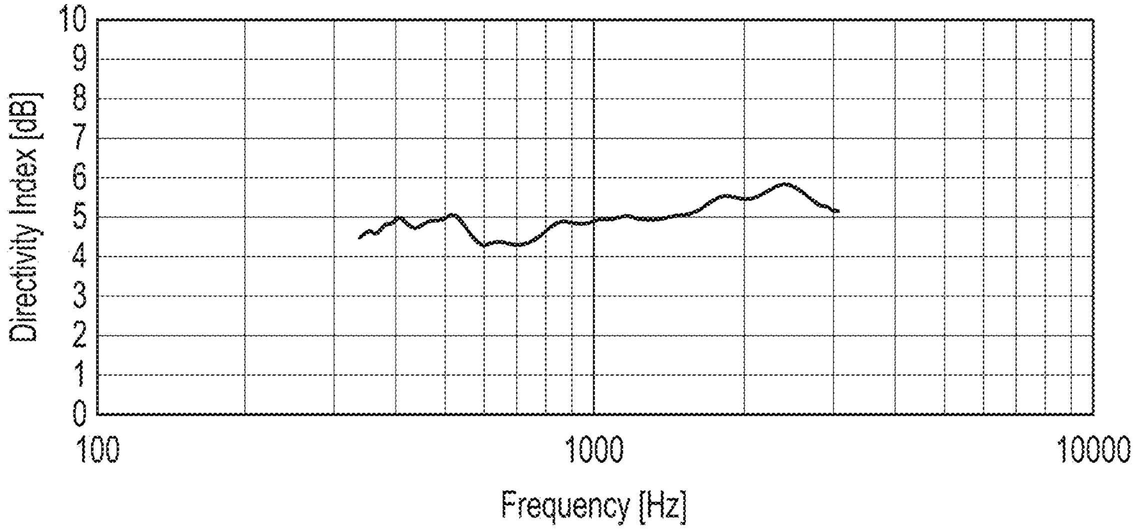

FIG. 16 shows the far-field directivity index of the first loudspeaker 101 shown in FIGS. 3*a*-*c*, with a "strong" magnet system of 0.55 T with respect to frequency, at a listening distance (distance to source) of 1 meter with ⅓$^{rd}$ octave smoothing.

As shown here, the directivity index in the designated frequency band of interest, here 300 Hz to 3 kHz, is comfortably above 4 dB for substantially the entire designated frequency band.

In general, it is preferred for there to be maximum backward damping (cardioid characteristic) as shown in FIGS. 15*a*-*b*, rather than a hyper-cardioid (towards the upper end of the frequency band, as shown in FIG. 15*c*) or a dipole characteristic (as shown in FIG. 8*a*). As demonstrated by FIGS. 15-16, if one does not want to have a back-lobe and the diaphragm size is small compared to the wavelength, a directivity index of ~4.8 dB is believed to be about as good as can be achieved.

Figure 17:
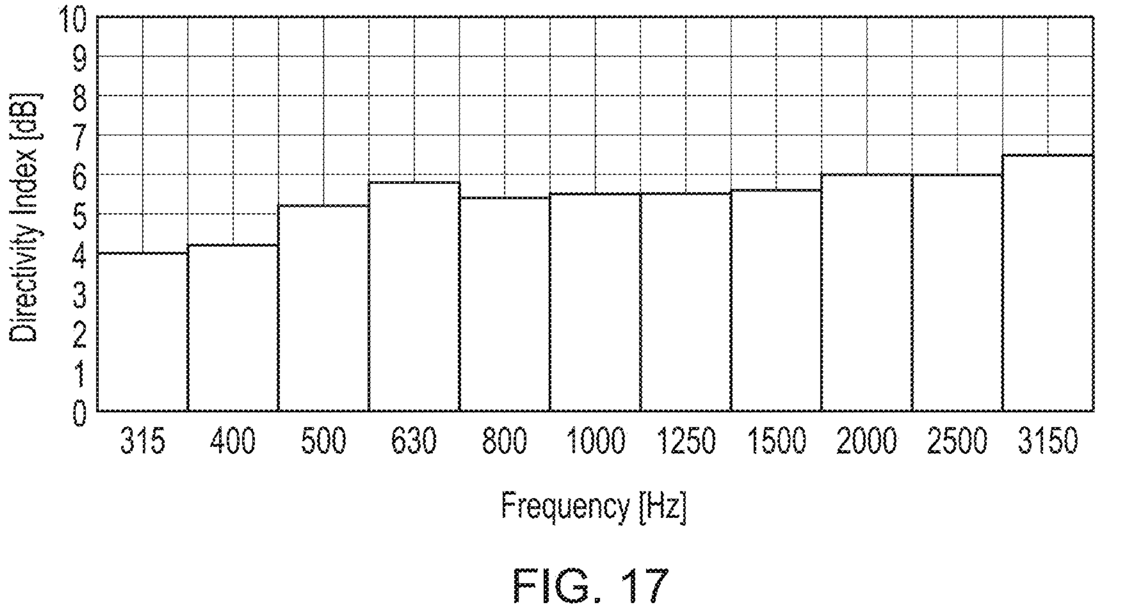

FIG. 17 shows the far-field directivity index of the first loudspeaker 101 shown in FIG. 7 (i.e. the fourth loudspeaker 401 in which the frame 434 and the magnet unit 422 are combined), at a listening distance (distance to source) of 1 meter. This time, the directivity index is shown at the "standard" centre frequencies within the designated frequency band of interest, here 300 Hz to 3 kHz, for ⅓$^{rd}$ octave bands (i.e. at 315 Hz, 400 Hz, 500 Hz, 630 Hz, 800 Hz, 1 kHz, 1.25 kHz, 1.6 kHz, 2 kHz, and 2.5 kHz).

The flux density for the fourth loudspeaker 401 used for the experimental results shown in FIG. 17 was 0.12 T which is much lower than for the first loudspeaker 101 used to obtain the experimental results shown in FIG. 16, though this is only mentioned for completeness, as the flux density is not believed to have a significant influence on directivity.

Comparing FIG. 16 and FIG. 17 illustrates some trade-offs resulting from using a more compact loudspeaker such as the fourth loudspeaker 401 of FIG. 7. In particular, FIG. 17 vs FIG. 16 shows that the directivity index for the more compact fourth loudspeaker 401 of FIG. 7 (10 $cm^3$) is more directional for higher frequencies compared with the larger first loudspeaker 101 shown in FIGS. 3*a-c* (26 $cm^3$). Further experimental work by the inventor (the results of which are not shown here) also show that the more compact fourth loudspeaker 401 of FIG. 7 has substantially less output at low frequencies compared with the larger first loudspeaker 101 shown in FIGS. 3*a-c*, meaning that the more compact fourth loudspeaker 401 of FIG. 7 is more suitable for use in combination with a mid-bass loudspeaker, whereas the larger first loudspeaker 101 shown in FIGS. 3*a-c* is more suitable for use in combination with a subwoofer.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word “comprise” and “include”, and variations such as “comprises”, “comprising”, and “including” will be understood to imply the inclusion of a stated integer or step or group of integers or steps but not the exclusion of any other integer or step or group of integers or steps.

It must be noted that, as used in the specification and the appended claims, the singular forms “a,” “an,” and “the” include plural referents unless the context clearly dictates otherwise. Ranges may be expressed herein as from “about” one particular value, and/or to “about” another particular value. When such a range is expressed, another embodiment includes from the one particular value and/or to the other particular value. Similarly, when values are expressed as approximations, by the use of the antecedent “about,” it will be understood that the particular value forms another embodiment. The term “about” in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

ISO 9053-1:2018 published October 2018

ISO 266:1997 published March 1997

“Dynamical Measurement of the Effective Radiating area SD”, Klippel GmbH

Acoustics, Beranek, L. L, McGraw-Hill, 1954

Thiele, A. N., “Loudspeakers in Vented Boxes, Parts I and II”, *J. Audio Eng. Soc.*, vol. 19, pp. 382-392 (May 1971); pp. 471-483 (June 1971).

Small, R. H., “Direct-Radiator Loudspeaker System Analysis”, *J. Audio Eng. Soc.*, vol. 20, pp. 383-395 (June 1972).

“Fabric solutions for Acoustic devices and components” (Sefar) https://www.sefar.com/en/609/Product-Finder/Filter-Components/Acoustic/Fabric-solutions-for-Acoustic-devices-and-components.pdf-?Folder=6916771

“Product News—Acousstex HD” (Saati) http://www.saati.com/sites/default/files/elemento-download/ACOUSTEX%20HD_4.pdf

WO2019/121266

WO2019/192808

WO2019/192816

PCT/EP2019/084950

GB1907610.8 (including any subsequent publications based on this application)

GB1907267.7 (including any subsequent publications based on this application)

GB1908551.3 (including any subsequent publications based on this application)

The invention claimed is:

1. A loudspeaker configured to be mounted in a seat assembly, the loudspeaker including:

a diaphragm having a first radiating surface and a second radiating surface, wherein the first radiating surface and the second radiating surface are located on opposite faces of the diaphragm;

a drive unit configured to move the diaphragm based on an electrical signal;

a loudspeaker support structure, wherein the diaphragm is suspended from the loudspeaker support structure via one or more loudspeaker suspension elements;

wherein the loudspeaker support structure encloses a volume configured to receive sound produced by the second radiating surface, wherein the loudspeaker support structure includes one or more regions of porous material having a specific airflow resistance in the range 300-5000 Pa·s/m, wherein the one or more regions of porous material are configured to allow sound produced by the second radiating surface to exit the volume enclosed by the loudspeaker support structure via the one or more regions of porous material;

wherein the surface area of the one or more regions of porous material is at least 80% of the effective radiating area of the diaphragm $S_D$.

2. A loudspeaker according to claim 1, wherein the one or more regions of porous material have a specific airflow resistance in the range 500-3000 Pa·s/m.

3. A loudspeaker according to claim 1, wherein the loudspeaker support structure includes a rigid frame from which the diaphragm is suspended via one or more loudspeaker suspension elements.

4. A loudspeaker according to claim 3, wherein the one or more regions of porous material are formed by a material having a specific airflow resistance in the range 300-5000 Pa·s/m which covers one or more openings in the rigid structure.

5. A loudspeaker according to claim 3, wherein the drive unit is an electromagnetic drive unit that includes a magnet unit configured to produce a magnetic field in an air gap, and wherein the magnet unit is directly attached to, or forms at least part of, the rigid frame from which the diaphragm is suspended via one or more loudspeaker suspension elements.

6. A loudspeaker according to claim 3, wherein the drive unit is an electromagnetic drive unit that includes a magnet unit configured to produce a magnetic field in an air gap, and wherein the magnet unit forms at least part of the rigid frame from which the diaphragm is suspended via one or more loudspeaker suspension elements, and the one or more regions of porous material are formed by a material having a specific airflow resistance in the range 300-5000 Pa·s/m which covers one or more openings in the magnet unit.

7. A loudspeaker according to claim 1, wherein the volume enclosed by the loudspeaker support structure is less than 100 $cm^3$.

8. A loudspeaker according to claim 1, wherein the loudspeaker is preferably a mid-high frequency loudspeaker configured to produce sound across a designated frequency band that includes at least 300 Hz-3 kHz.

9. A loudspeaker according to claim 1, wherein the resonance frequency of the loudspeaker is in the range 150 Hz to 500 Hz.

10. A loudspeaker according to claim 1, wherein the drive unit is an electromagnetic drive unit that includes a magnet unit configured to produce a magnetic field in an air gap, and a voice coil attached to the diaphragm, wherein the magnet unit has a magnetic flux density in an air gap in the range 0.1 T to 0.5 T.

11. A loudspeaker according to claim 1, wherein the loudspeaker has an electrical Q factor, Qes, that is 5 or more and a mechanical Q factor, Qms, that is 2 or less.

12. A loudspeaker according to claim 1, wherein the loudspeaker has a directivity index within a designated frequency band of 300 Hz-3 kHz that is 4 dB or more for substantially the entire designated frequency band.

13. A loudspeaker according to claim 1, wherein the loudspeaker has, within a designated frequency band of 300 Hz-3 kHz, a sound pressure level, SPL, measured on a principal radiating axis that is at least 6 dB higher than the SPL measured at the same listening distance at 180° to the principal radiating axis, for substantially the entire designated frequency band.

14. A seat assembly that includes:

a first loudspeaker according to claim 1, wherein the first loudspeaker is located within the seat assembly for use with a first ear of a user located at a listening position that is 30 cm or less from the first radiating surface of the diaphragm of the first loudspeaker;

a second loudspeaker according to claim 1, wherein the second loudspeaker is located within the seat assembly for use with a second ear of a user located at a listening position that is 30 cm or less from the first radiating surface of the diaphragm of the second loudspeaker.

15. A seat assembly according to claim 14 that further includes:

a headrest;

a seat portion;

wherein the first loudspeaker is mounted in the headrest of the seat assembly; and wherein the second loudspeaker is mounted in the headrest of the seat assembly.

16. A loudspeaker configured to be mounted in a seat assembly, the loudspeaker including:

a diaphragm having a first radiating surface and a second radiating surface, wherein the first radiating surface and the second radiating surface are located on opposite faces of the diaphragm;

a drive unit configured to move the diaphragm based on an electrical signal;

a loudspeaker support structure, wherein the diaphragm is suspended from the loudspeaker support structure via one or more loudspeaker suspension elements;

wherein the loudspeaker support structure encloses a volume configured to receive sound produced by the second radiating surface, wherein the loudspeaker support structure includes one or more regions of porous material having a specific airflow resistance in the range 300-5000 Pa·s/m, wherein the one or more regions of porous material are configured to allow sound produced by the second radiating surface to exit the volume enclosed by the loudspeaker support structure via the one or more regions of porous material;

wherein the loudspeaker has an electrical Q factor, Qes, that is 5 or more and a mechanical Q factor, Qms, that is 2 or less.

17. A loudspeaker configured to be mounted in a seat assembly, the loudspeaker including:

a diaphragm having a first radiating surface and a second radiating surface, wherein the first radiating surface and the second radiating surface are located on opposite faces of the diaphragm;

a drive unit configured to move the diaphragm based on an electrical signal;

a loudspeaker support structure, wherein the diaphragm is suspended from the loudspeaker support structure via one or more loudspeaker suspension elements;

wherein the loudspeaker support structure encloses a volume configured to receive sound produced by the second radiating surface, wherein the loudspeaker support structure includes one or more regions of porous material having a specific airflow resistance in the range 300-5000 Pa·s/m, wherein the one or more regions of porous material are configured to allow sound produced by the second radiating surface to exit the volume enclosed by the loudspeaker support structure via the one or more regions of porous material;

wherein the loudspeaker support structure includes a rigid frame from which the diaphragm is suspended via one or more loudspeaker suspension elements;

wherein the drive unit is an electromagnetic drive unit that includes a magnet unit configured to produce a magnetic field in an air gap, and wherein the magnet unit forms at least part of the rigid frame from which the diaphragm is suspended via one or more loudspeaker suspension elements, and the one or more regions of porous material are formed by a material having a specific airflow resistance in the range 300-5000 Pa·s/m which covers one or more openings in the magnet unit.

18. A loudspeaker configured to be mounted in a seat assembly, the loudspeaker including:

a diaphragm having a first radiating surface and a second radiating surface, wherein the first radiating surface and the second radiating surface are located on opposite faces of the diaphragm;

a drive unit configured to move the diaphragm based on an electrical signal;

a loudspeaker support structure, wherein the diaphragm is suspended from the loudspeaker support structure via one or more loudspeaker suspension elements;

wherein the loudspeaker support structure encloses a volume configured to receive sound produced by the second radiating surface, wherein the loudspeaker support structure includes one or more regions of porous material having a specific airflow resistance in the range 300-5000 Pa·s/m, wherein the one or more regions of porous material are configured to allow sound produced by the second radiating surface to exit the volume enclosed by the loudspeaker support structure via the one or more regions of porous material;

wherein the loudspeaker has a directivity index within a designated frequency band of 300 Hz-3 kHz that is 4 dB or more for substantially the entire designated frequency band.

19. A loudspeaker configured to be mounted in a seat assembly, the loudspeaker including:

a diaphragm having a first radiating surface and a second radiating surface, wherein the first radiating surface and the second radiating surface are located on opposite faces of the diaphragm;

a drive unit configured to move the diaphragm based on an electrical signal;

a loudspeaker support structure, wherein the diaphragm is suspended from the loudspeaker support structure via one or more loudspeaker suspension elements;

wherein the loudspeaker support structure encloses a volume configured to receive sound produced by the second radiating surface, wherein the loudspeaker support structure includes one or more regions of porous material having a specific airflow resistance in the range 300-5000 Pa·s/m, wherein the one or more regions of porous material are configured to allow sound produced by the second radiating surface to exit the volume enclosed by the loudspeaker support structure via the one or more regions of porous material;

wherein the loudspeaker has, within a designated frequency band of 300 Hz-3 kHz, a sound pressure level, SPL, measured on a principal radiating axis that is at least 6 dB higher than the SPL measured at the same listening distance at 180° to the principal radiating axis, for substantially the entire designated frequency band.

* * * * *